(12) United States Patent
Wang et al.

(10) Patent No.: US 11,742,999 B2
(45) Date of Patent: Aug. 29, 2023

(54) DYNAMIC ALLOCATION OF RETRANSMISSION RESOURCES

(71) Applicant: QUALCOMM Incorporated, San Diego, CA (US)

(72) Inventors: Hua Wang, Basking Ridge, NJ (US); Piyush Gupta, Bridgewater, NJ (US); Lik Hang Silas Fong, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/949,599

(22) Filed: Nov. 5, 2020

(65) Prior Publication Data
US 2021/0320757 A1    Oct. 14, 2021

Related U.S. Application Data

(60) Provisional application No. 63/007,085, filed on Apr. 8, 2020.

(51) Int. Cl.
| | |
|---|---|
| *H04L 1/1867* | (2023.01) |
| *H04W 72/0446* | (2023.01) |
| *H04W 72/23* | (2023.01) |
| *H04W 72/53* | (2023.01) |
| *H04W 72/1263* | (2023.01) |

(52) U.S. Cl.
CPC ......... *H04L 1/189* (2013.01); *H04W 72/0446* (2013.01); *H04W 72/1263* (2013.01); *H04W 72/23* (2023.01); *H04W 72/53* (2023.01)

(58) Field of Classification Search
None
See application file for complete search history.

(56) References Cited

U.S. PATENT DOCUMENTS

| | | | |
|---|---|---|---|
| 2008/0310361 A1 | 12/2008 | Cho et al. | |
| 2009/0262678 A1 | 10/2009 | Oyman et al. | |
| 2020/0120707 A1* | 4/2020 | Hassan Hussein | ... H04W 72/14 |
| 2021/0028891 A1* | 1/2021 | Zhou | ...... H04L 1/1819 |
| 2021/0258108 A1* | 8/2021 | Basu Mallick | ....... H04L 1/1893 |
| 2021/0306824 A1* | 9/2021 | Li | .......... H04L 1/1887 |
| 2021/0314097 A1* | 10/2021 | Osawa | ...... H04L 1/1864 |
| 2021/0376959 A1* | 12/2021 | Yang | ..... H04L 1/1887 |
| 2022/0007337 A1* | 1/2022 | Lee | ....... H04W 80/02 |

(Continued)

OTHER PUBLICATIONS

International Search Report and Written Opinion—PCT/US2021/020700—ISA/EPO—dated Jul. 2, 2021.

*Primary Examiner* — Marcus Smith
(74) *Attorney, Agent, or Firm* — Danai Nelisile Mehembere; Harrity & Harrity, LLP

(57) ABSTRACT

Various aspects of the present disclosure generally relate to wireless communication. In some aspects, a base station may determine an estimated total amount of resources for one or more retransmissions of communications among the base station, a controller, and a device, the one or more retransmissions associated with one or more transmissions between at least two of the base station, the controller, or the device; and transmit, to at least one of the controller or the device, an indication of an allocation of resources based at least in part on the estimated total amount of resources for the one or more retransmissions. Numerous other aspects are provided.

30 Claims, 15 Drawing Sheets

(56) References Cited

U.S. PATENT DOCUMENTS

| | | | |
|---|---|---|---|
| 2022/0007403 A1* | 1/2022 | Li | H04W 72/1289 |
| 2022/0150872 A1* | 5/2022 | Park | H04W 72/14 |
| 2022/0361227 A1* | 11/2022 | Lee | H04L 1/08 |

* cited by examiner

DYNAMIC ALLOCATION OF RETRANSMISSION RESOURCES

CROSS-REFERENCE TO RELATED APPLICATION

This Patent Applications claims priority to Provisional Patent Application No. 63/007,085, filed on Apr. 8, 2020, entitled "DYNAMIC ALLOCATION OF RETRANSMISSION RESOURCES," and assigned to the assignee hereof. The disclosure of the prior Applications is considered part of and is incorporated by reference in this Patent Application.

FIELD OF THE DISCLOSURE

Aspects of the present disclosure generally relate to wireless communication and to techniques and apparatuses for dynamic allocation of retransmission resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining an estimated total amount of resources for one or more retransmissions of communications among the base station, a controller, and a device, the one or more retransmissions associated with one or more transmissions between at least two of the base station, the controller, or the device; and transmitting, to at least one of the controller or the device, an indication of an allocation of resources based at least in part on the estimated total amount of resources for the one or more retransmissions.

In some aspects, a method of wireless communication, performed by a device, may include receiving, from a base station, an indication of an allocation of resources for one or more retransmissions of communications, wherein the allocation of resources is based at least in part on a determination of an estimated total amount of resources for one or more retransmissions of communications among the base station, a controller, and the device, the one or more retransmissions associated with one or more transmissions between at least two of the base station, the controller, or the device; and communicating, with at least one of the base station or the controller, the one or more retransmissions of communications based at least in part on the allocation of resources.

In some aspects, a method of wireless communication, performed by a controller, may include receiving, from a base station, an indication of an allocation of resources for one or more retransmissions of communications, wherein the allocation of resources is based at least in part on a determination of an estimated total amount of resources for one or more retransmissions of communications among the base station, the controller, and a device, the one or more retransmissions associated with one or more transmissions between at least two of the base station, the controller, or the device; and communicating, with at least one of the base station or the device, the one or more retransmissions of communications based at least in part on the allocation of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
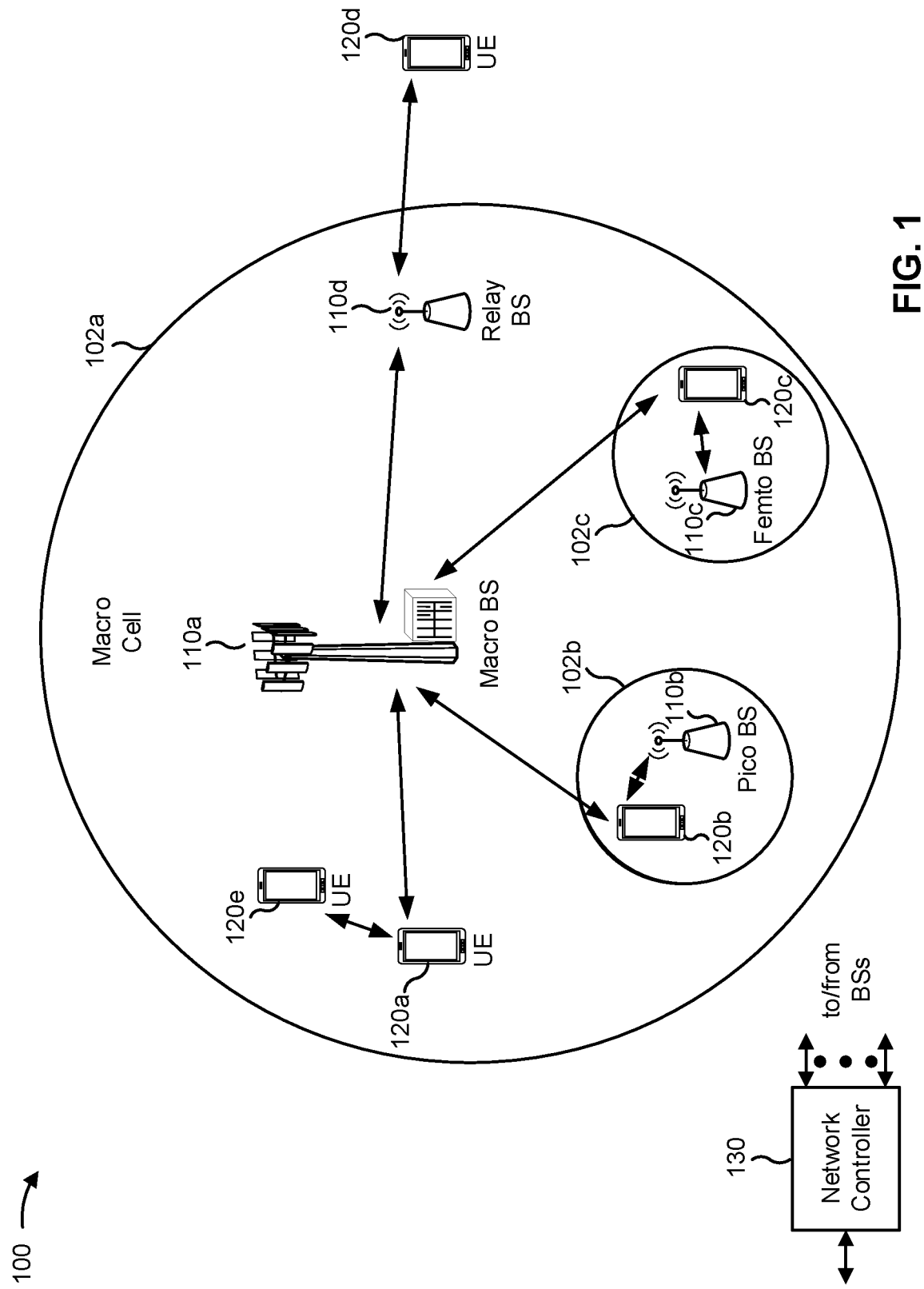
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Some wireless communications may be performed in connection with factory automation, e.g., and may comprise Industrial IoT (IIoT) based communications. Some equipment may include a base station, a controller (e.g., a Programmable Logic Controller (PLC)), and a device (e.g., a sensor, an actuator, a piece of industrial equipment, and/or the like). The controller may receive information from such device(s) (e.g., sensor(s)/actuator(s)) and may provide commands to the device(s) or to factory equipment associated with the device(s). For example, a controller may automate control of machines and control systems of industrial electromechanical processes, such as controlling machinery on factory assembly lines, amusement rides, light fixtures, and/or the like. The communications between the base station, the controller, and the devices may have low latency requirements and high reliability requirements. For example, the communications may have a latency requirement of less than 2 ms, or less than 1 ms. The communications may have a reliability requirement on the order of $10^{-5}$ or $10^{-6}$ error rates, such as 99.9999% reliability. The latency and reliability may apply to data and control channels.

Some techniques and apparatuses described herein help to reduce latency, improve reliability, and conserve resources by providing for dynamic allocation of retransmission resources for retransmissions of failed transmissions between a base station, a controller, and/or a device. For example, a base station may reserve resources for a number of retransmissions of failed transmissions within the wireless network. Equipment in the wireless network (e.g., the base station, a controller, and/or a device) may transmit a first data transmission to other equipment in the wireless network and may receive feedback indicating for the data to be retransmitted. The equipment may indicate the need for a retransmission to the base station. The base station may dynamically allocate the retransmission resources for the retransmission, as described herein. The retransmission may improve the reliability of the communications within the wireless network. Moreover, dynamically allocating retransmission resources for retransmissions of failed transmissions may conserve network resources (e.g., time resources, frequency resources, spatial resources, and/or the like).

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
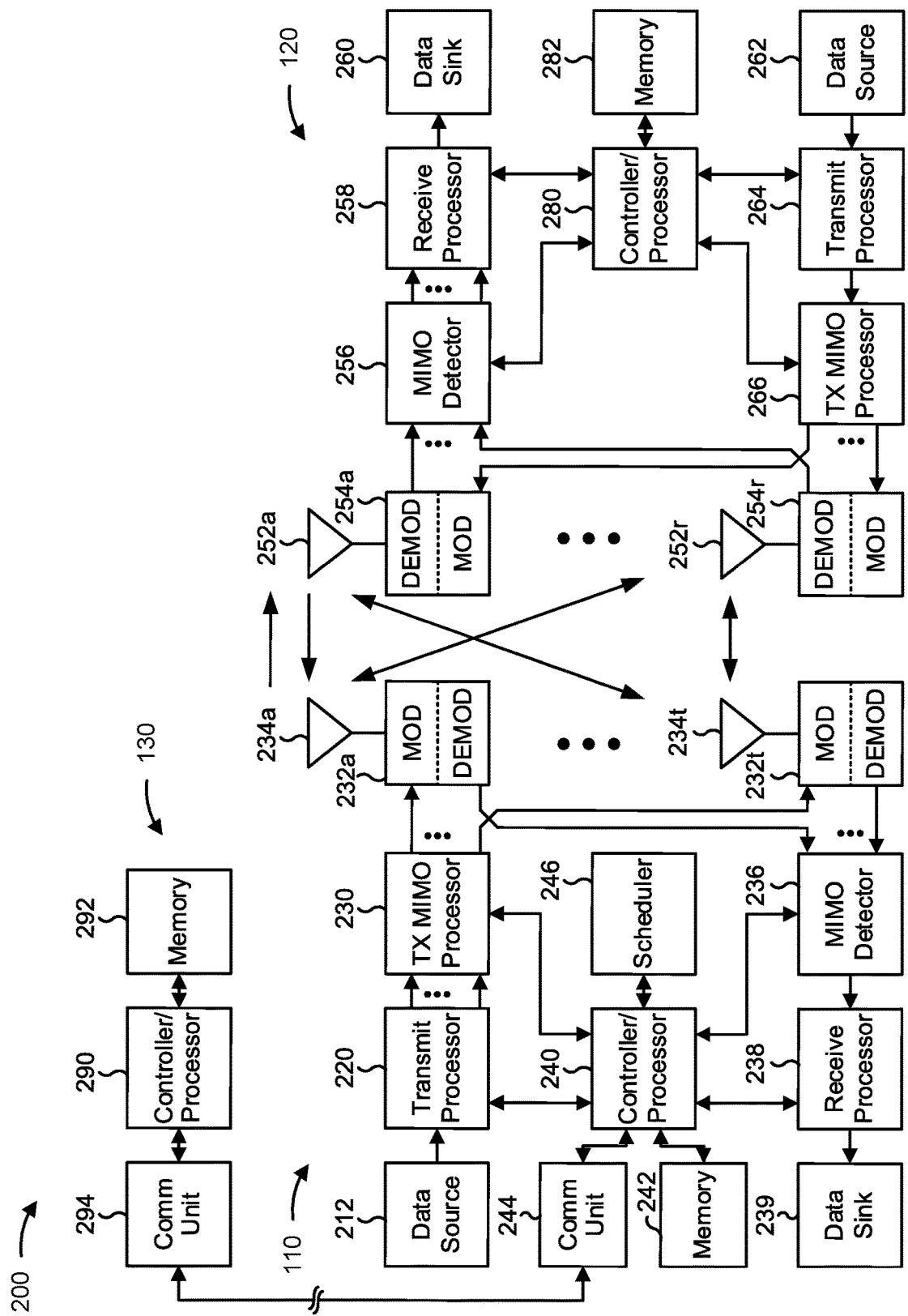
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic allocation of retransmission resources, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 (e.g., a device) may include means for receiving, from a base station, an indication of an allocation of resources for one or more retransmissions of communications, wherein the allocation of resources is based at least in part on a determination of an estimated total amount of resources for one or more retransmissions of communications among the base station, a controller, and the device, the one or more retransmissions associated with one or more transmissions between at least two of the base station, the controller, or the device; means for communicating, with at least one of the base station or the controller, the one or more retransmissions of communications based at least in part on the allocation of resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a controller (e.g., base station 110, UE 120, and/or the like) may include means for receiving, from a base station, an indication of an allocation of resources for one or more retransmissions of communications, wherein the allocation of resources is based at least in part on a determination of an estimated total amount of resources for one or more retransmissions of communications among the base station, the controller, and a device, the one or more retransmissions associated with one or more transmissions between at least two of the base station, the controller, or the device; means for communicating, with at least one of the base station or the device, the one or more retransmissions of communications based at least in part on the allocation of resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining an estimated total amount of resources for one or more retransmissions of communications among the base station, a controller, and a device, the one or more retransmissions associated with one or more transmissions between at least two of the base station, the controller, or the device; means for transmitting, to at least one of the controller and the device, an indication of an allocation of resources based at least in part on the estimated total amount of resources for the one or more retransmissions; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communications may be based, for example, on Industrial Internet of Things (IIoT). Such communications may include communication between a base station, a controller (e.g., a PLC), a device (e.g., a sensor/actuator), and/or the like. The controller may provide commands in wireless signals to factory equipment. Device(s) may be separate from the factory equipment and/or may be included in or positioned at a piece of factory equipment. The controller(s) may automate control of machines and control systems (e.g., of industrial electromechanical processes,) such as control of machinery on factory assembly lines, amusement rides, light fixtures, and/or the like.

Figure 3A:
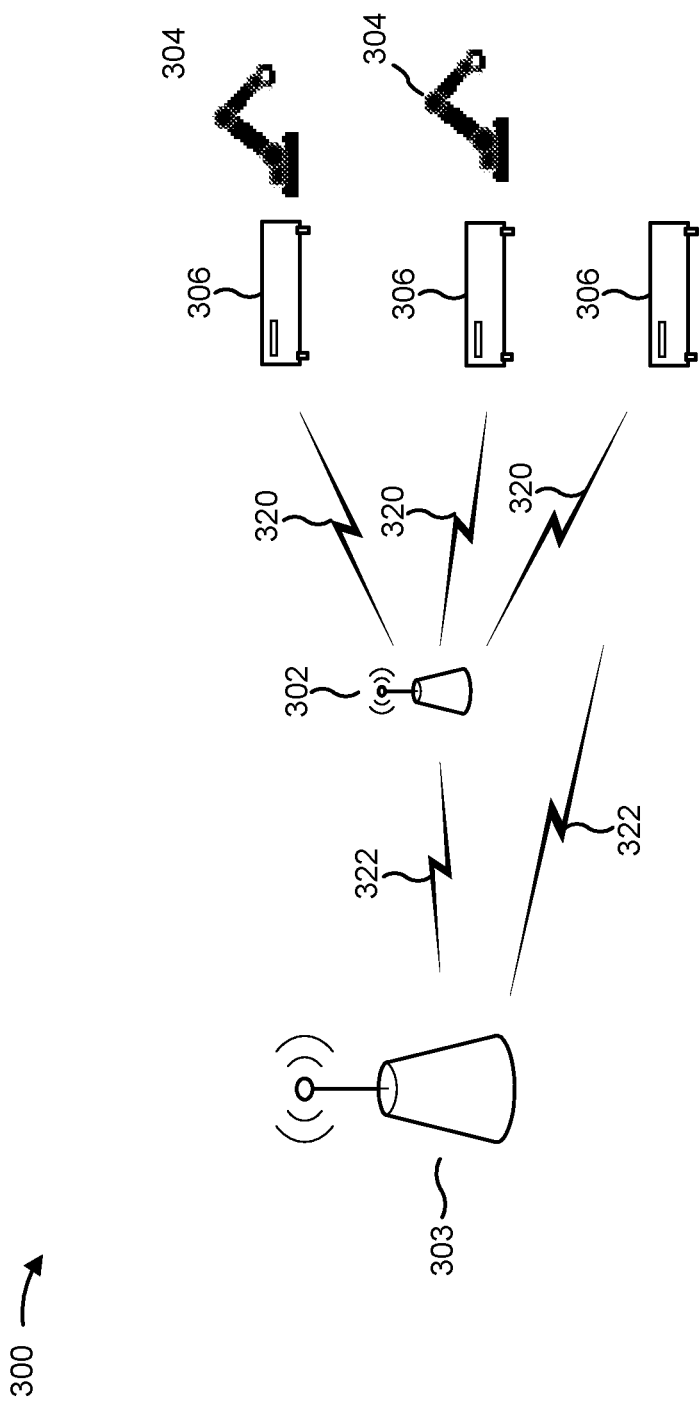
FIG. 3A is a diagram illustrating an example of a wireless communication system, in accordance with various aspects of the present disclosure.

FIG. 3A is a diagram illustrating an example 300 of a wireless communication system, in accordance with various aspects of the present disclosure. As shown, example 300 may include a controller 302 that exchanges wireless communication 320 with devices 306 that may be associated with equipment 304. The example 300 may also include a base station 303 that exchanges communication 322 with the controller 302 and/or communication 322 with the devices 306.

The communication between the controller 302 and device(s) 306 may include cyclic exchanges of information. The controller 302 may potentially exchange cyclic information with a large number of devices 306.

As indicated above, FIG. 3A is provided as an example. Other examples may differ from what is described with respect to FIG. 3A.

Figure 3B:
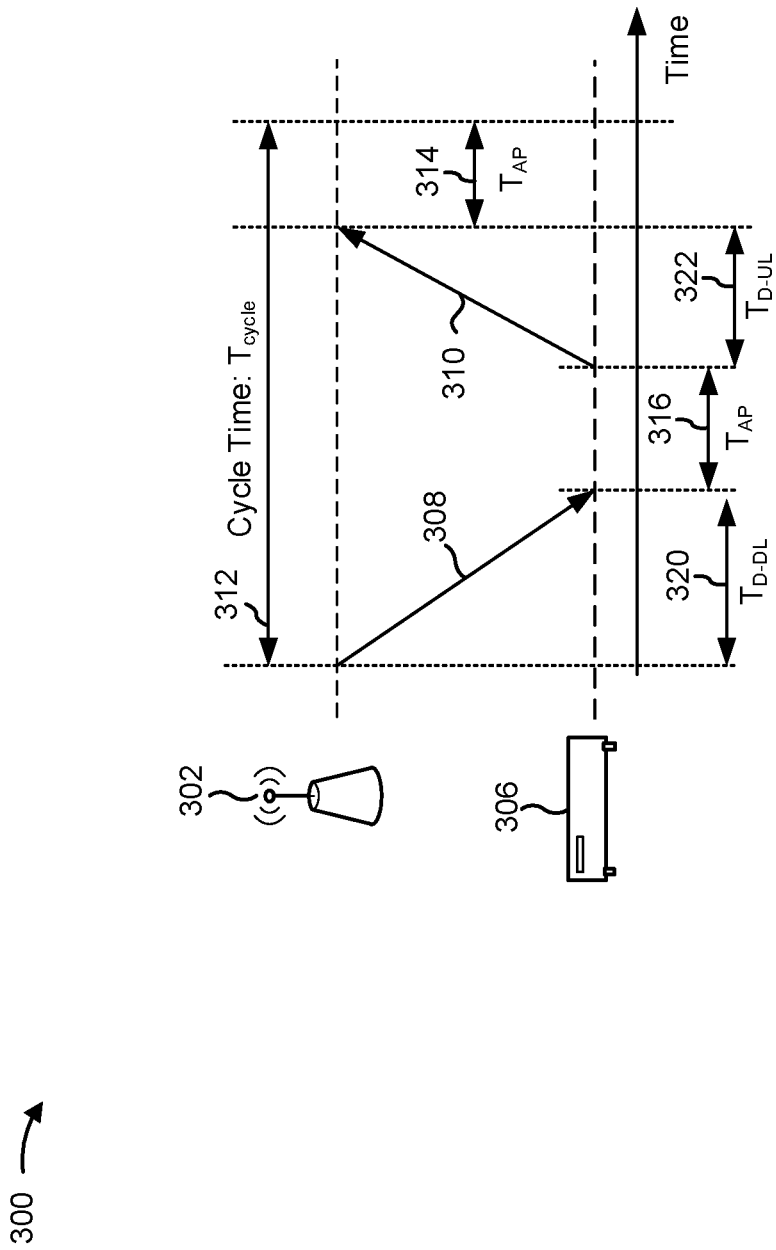
FIG. 3B is a diagram illustrating an example communication cycle, in accordance with various aspects of the present disclosure.

FIG. 3B is a diagram illustrating an example 300 communication cycle, in accordance with various aspects of the present disclosure. As shown, example 300 may include periodic or cyclic traffic that may be exchanged between the controller 302 and a device 306. The controller 302 may transmit communication 308, such as a command or other communication, to device 306 or equipment 304 during a period of time TD-DL, 320. The communication 308 from the PLC to the device 306 (e.g., a sensor/actuator) may be referred to as a downlink communication. The device 306 may receive the communication 308, and may take an action based on the command. Following the action, the device 306 may transmit communication 310 back to the controller 302 during period of time TD-UL, 322. For example, a sensor may respond with location information, temperature information, and/or the like. The sensor may report back to the controller 302 a result that occurs due to action from a command received from the controller 302. The report may comprise an acknowledgement (e.g., a simple application layer acknowledgment). As well, the sensor may report a current status of the sensor (e.g., an updated location, and/or the like) following a command. There may be a processing time duration 316 ($T_{AP}$) (e.g., an actuation and/or sensing duration) between receipt of the communication 308 from the controller 302 and transmission of the communication 310 from the device 306. The communication 310 that is transmitted from the device 306 to the controller 302 may be referred to as an uplink communication. After the controller 302 receives the communication 310 from the device 306, there may be a processing duration 314 ($T_{AP}$) during which the controller 302 processes the received information (e.g., communication 310), and before the controller 302 sends additional communication/commands to the device 306. The combined cycle may have a duration 312 of length $T_{cycle}$. Following the duration $T_{AP}$, the cycle may repeat, with the controller 302 sending additional communication 308 to the device 306. The example 300 may accommodate periodic, regular traffic between controllers 302 and devices 306 (e.g., downlink traffic from the controller 302 to the devices 306, and uplink traffic from the devices 306 to the controller 302). The communication between the controller 302 and the devices 306 may be associated with a low latency and high reliability. For example, the communication may be based on a latency of less than 2 ms or less than 1 ms. The communication may have a reliability requirement on the order of $10^{-5}$ or $10^{-6}$, such as 99.9999% reliability. The latency and reliability may apply to data and control channels.

The controller 302 may use a control channel, such as a PDCCH, to grant resources to a device 306 for use in transmitting the periodic uplink communication 310. Factory automation may involve a high device 306 density (e.g., approximately 1 UE per m$^2$). Therefore, a large number of devices 306 may communicate with the controller 302. Sending a dynamic grant (e.g., one DCI per slot) to each of the large number of devices 306 may place a burden on PDCCH overhead. Semi-persistent scheduling (SPS) may be used to reduce the overhead requirements of PDCCH by enabling the devices 306 to be granted resources in a semi-persistent or periodic manner. SPS may also be used to schedule resources for receiving downlink communication. The SPS may be communicated to each device 306 using radio resource control (RRC) signaling and/or DCI. In some examples, SPS may be used for a first transmission, and PDCCH may be used to schedule a possible retransmission if the first transmission is not accurately received.

As indicated above, FIG. 3B is provided as an example. Other examples may differ from what is described with respect to FIG. 3B.

Figure 4:
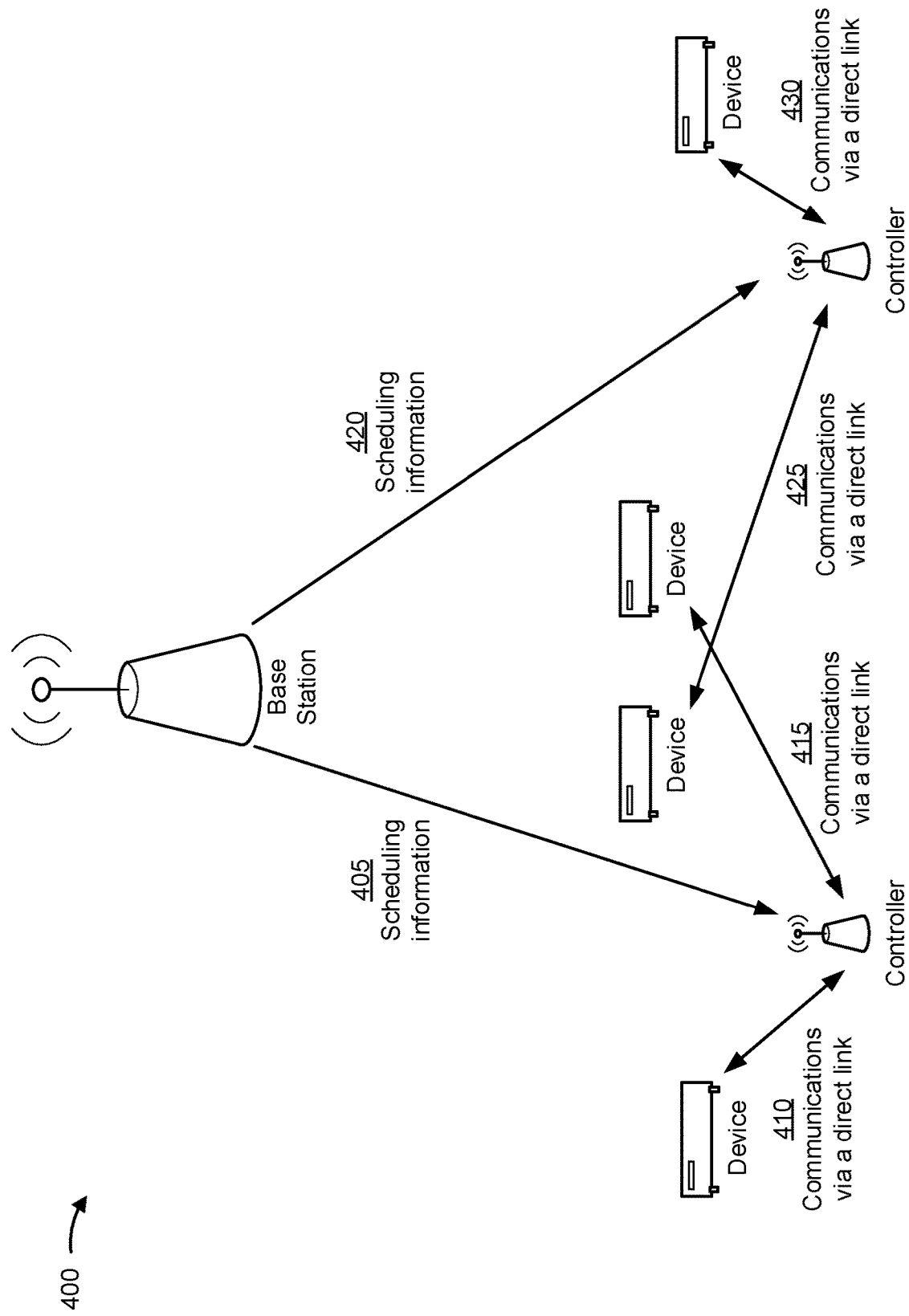
FIG. 4 is a diagram illustrating an example of a link association for a device, in accordance with various aspects of the present disclosure.

FIG. 4 is a diagram illustrating an example 400 of a link association for a device, in accordance with various aspects of the present disclosure. As shown, a base station, one or more controllers, and one or more devices may communicate via a wireless network. The one or more controllers may generate data to control operations of one or more devices. In some aspects, the wireless network may include an IIoT wireless network.

A wirelessly connected controller may be located close to factory equipment and/or devices. For example, controllers may be located close to equipment, whereas a base station may be ceiling mounted or at a greater distance from the equipment.

As shown in FIG. 4, and by reference number 405, a base station may transmit scheduling information to a controller. The scheduling information may include resource allocations for each communication between the controller and associated devices. Alternatively, the scheduling information may include a resource allocation that the controller may use to allocate resources for individual communications between the controller and the associated devices. As shown by reference numbers 410 and 415, the controller may communicate with the associated devices using direct communication links.

As shown by reference number 420, the base station may transmit scheduling information to another controller. The scheduling information may include resource allocations for communications between the other controller and associated devices. The resource allocations for the other controller may be based at least in part on other network traffic (e.g., communications involving other controllers, other devices, and/or the like). As shown by reference numbers 425 and 430, the other controller may communicate with the associated devices using direct communication links.

Based at least in part on using direct communication links, the wireless network may satisfy the latency requirements and may maintain a relatively low load for the network. However, if a quality of the direct communication links is poor, the direct communication links may fail the reliability requirements.

As indicated above, FIG. 4 is provided as an example. Other examples may differ from what is described with respect to FIG. 4.

Figure 5:
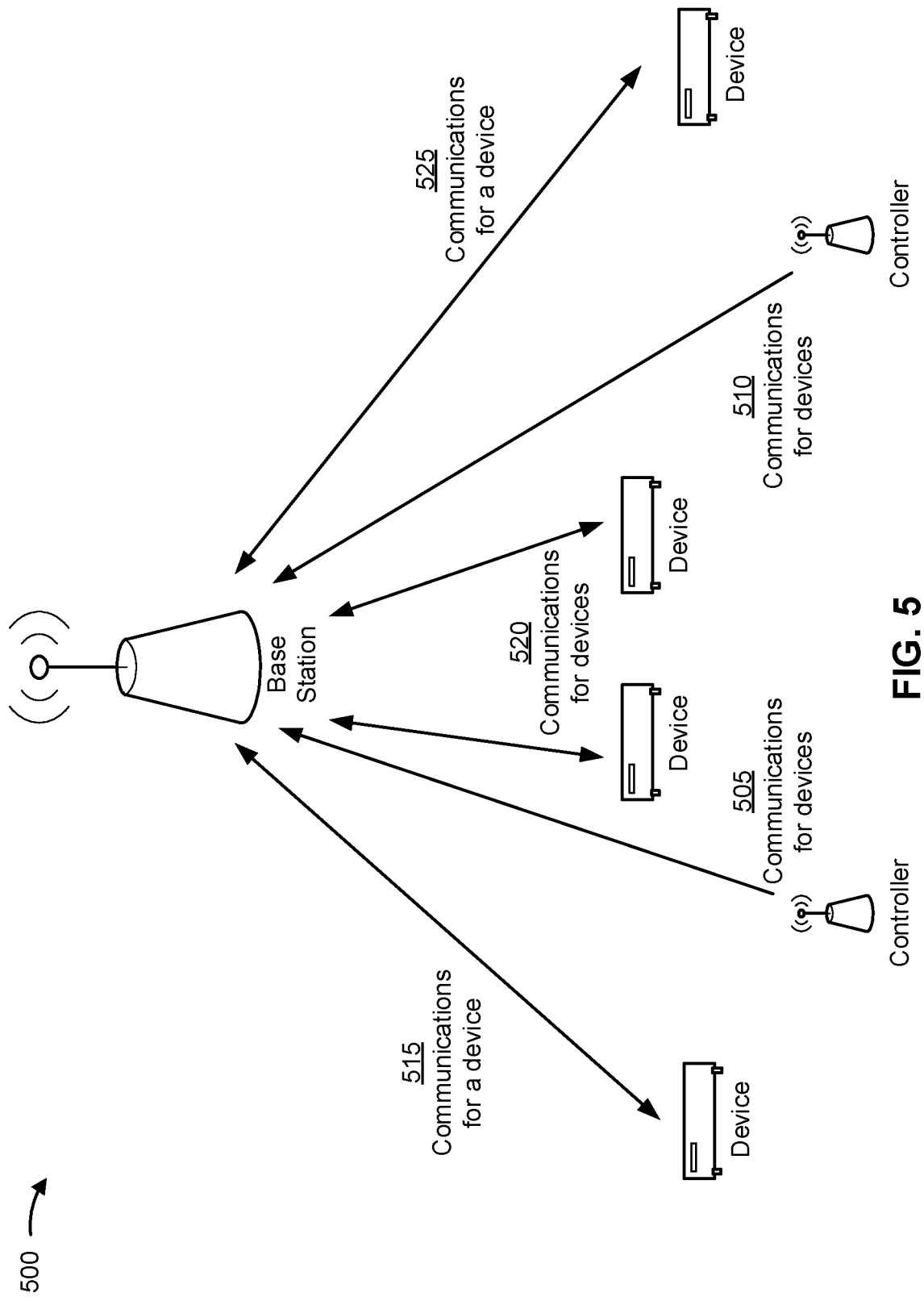
FIG. 5 is a diagram illustrating an example of a link association for a device, in accordance with various aspects of the present disclosure.

FIG. 5 is a diagram illustrating an example 500 of a link association for a device, in accordance with various aspects of the present disclosure. As shown, a base station, one or more controllers, and one or more devices may communicate via a wireless network. The one or more controllers may generate data to control operations of the device. In some aspects, the wireless network may include an IIoT wireless network.

As shown in FIG. 5, and by reference numbers 505 and 510, a first controller and a second controller may transmit communications for devices to the base station. As shown by reference numbers 515, 520, and 525, the base station may transmit the communications for the devices. This configuration may be referenced as a 2-hop configuration.

Based at least in part on using a 2-hop configuration, a reliability of the communications for the devices may satisfy the reliability requirements. For example, the base station may be positioned at a location to provide a relatively good coverage area. In some aspects, the base station may be positioned near a ceiling of a room and the one or more controllers may be positioned near a floor of a room (e.g., with an increased likelihood of having obstructions (permanent or temporary) between the controller and associated devices). Additionally, or alternatively, the base station may be configured with components that are configured to provide a relatively good coverage area (e.g., relative to components of the controller).

As indicated above, FIG. 5 is provided as an example. Other examples may differ from what is described with respect to FIG. 5.

Figure 6:
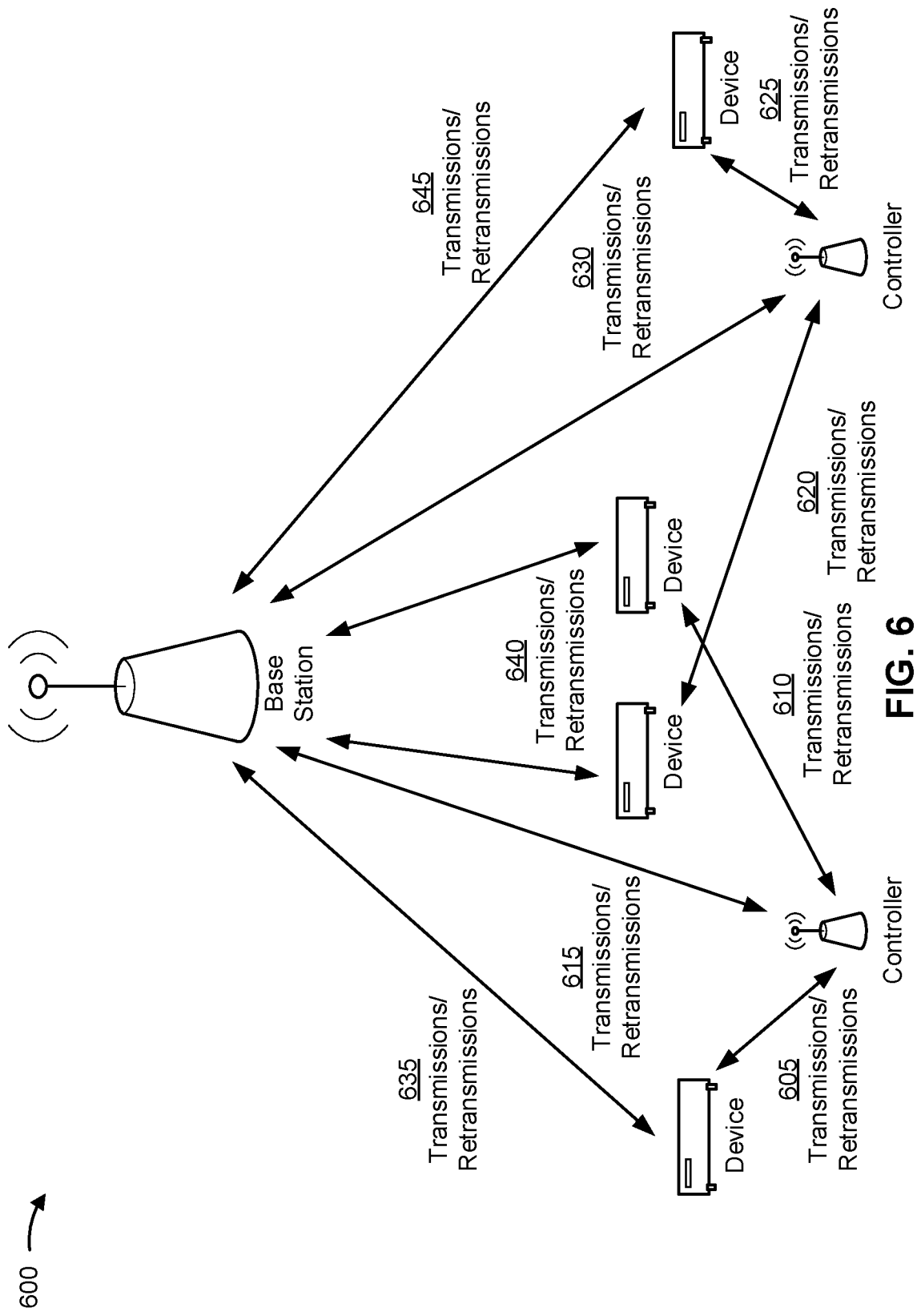
FIG. 6 is a diagram illustrating an example of communication among links of a wireless network, in accordance with various aspects of the present disclosure.

FIG. 6 is a diagram illustrating an example 600 of communication among one or links of a wireless network, in accordance with various aspects of the present disclosure. As shown, a base station, one or more controllers, and one or more devices may communicate via a wireless network. The one or more controllers may generate data to control operations of the device. In some aspects, the wireless network may include an IIoT wireless network.

As shown in FIG. 6, and by reference numbers 605 and 610, a controller may attempt to transmit communications to associated devices. For example, the controller may transmit original transmissions to the devices. The controller may receive an acknowledgement or a negative acknowledgement, or may fail to receive feedback, associated with each of the transmitted communications. The controller may determine that a retransmission is needed based at least in part on receiving a negative acknowledgement or failing to receive feedback. If the controller determines that a retransmission is needed, the controller may determine whether the retransmission is needed based at least in part on blocking (e.g., by an obstruction), interference, and/or the like.

In some aspects, the links between the base station and the controllers may be based on a Uu interface. The links between the base station and the devices may also be based on a Uu interface. The links between the controllers and the devices may be based on a PC5 interface. In some aspects, the controllers may operate similarly to a UE or as a sidelink device. In some aspects, the controllers may use the base station for inter-controller coordination with other controllers. The controllers may use the base station for a backhaul to a human machine interface (HMI). The controllers may use the base station as a system controller. The base station may perform interference management (IM) across multiple controllers. The base station may handle other network functions for the devices, such as initial access with the network, mobility, and/or the like. As the devices communicate with the controller(s) based on sidelink and with the base station based on uplink/downlink, the devices support both Uu and PC5 based communication. As the controllers communicate with the devices based on sidelink and with the base station based on uplink/downlink, the controllers support both Uu and PC5 based communication.

In some aspects, the controllers may operate similarly to a small cell or a relay node having a wireless backhaul to the base station. The controllers may include aspects of an integrated access and backhaul (IAB) framework. The controllers may each include a mobile termination (MT) component that operates similarly to a UE in receiving control/data from the base station. The controllers may each include a distributed unit (DU) component that schedules resources for communication with their respective devices and that provides downlink communication to their respective devices.

As shown by reference number 615, the base station may also receive the transmitted communications intended for the associated devices. The base station may receive the transmissions from the controller such that the base station is able to retransmit the transmissions, if needed.

As shown by reference numbers 635, 640, and 645, the base station may retransmit, to the devices, the transmitted communications. As shown by reference numbers 615 and 630, the base station may retransmit, to the controllers, the transmitted communications. The base station may retransmit the transmitted communications based at least in part on receiving indications from the controller, the devices, and/or the like that indicate that the base station is to retransmit the transmitted communications.

As shown by reference numbers 605, 610, 620, and 625, the controllers may retransmit, to the devices, the transmitted communications. As shown by reference numbers 615 and 630, the controllers may retransmit, to the base station, the transmitted communications. The controllers may retransmit the transmitted communications based at least in part on receiving indications from the base station, the devices, and/or the like that indicate that the controllers are to retransmit the transmitted communications.

As shown by reference numbers 605, 610, 620, and 625, the devices may retransmit, to the controllers, the transmitted communications. As shown by reference numbers 635, 640, and 645, the devices may retransmit, to the base station, the transmitted communications. The devices may retransmit the transmitted communications based at least in part on receiving indications from the base station, one or more controllers, and/or the like that indicate that the devices are to retransmit the transmitted communications.

The transmission of control by the base station may help to improve reliability. Such control by the base station may involve two hops in order to provide the control to the device (e.g., a first hop from a controller to the base station, and a second hop from the base station to the device). In some examples, a portion of scheduling for the devices may be provided by the base station, and another portion of the scheduling for the devices may be provided by the controller(s). Providing some control directly from the controller may help to reduce over-the-air signaling and may improve latency. However, transmissions from the controller may be blocked for a particular device. Blocks of links between controllers and various devices may last for different amounts of time.

As indicated above, FIG. 6 is provided as an example. Other examples may differ from what is described with respect to FIG. 6.

Figure 7:
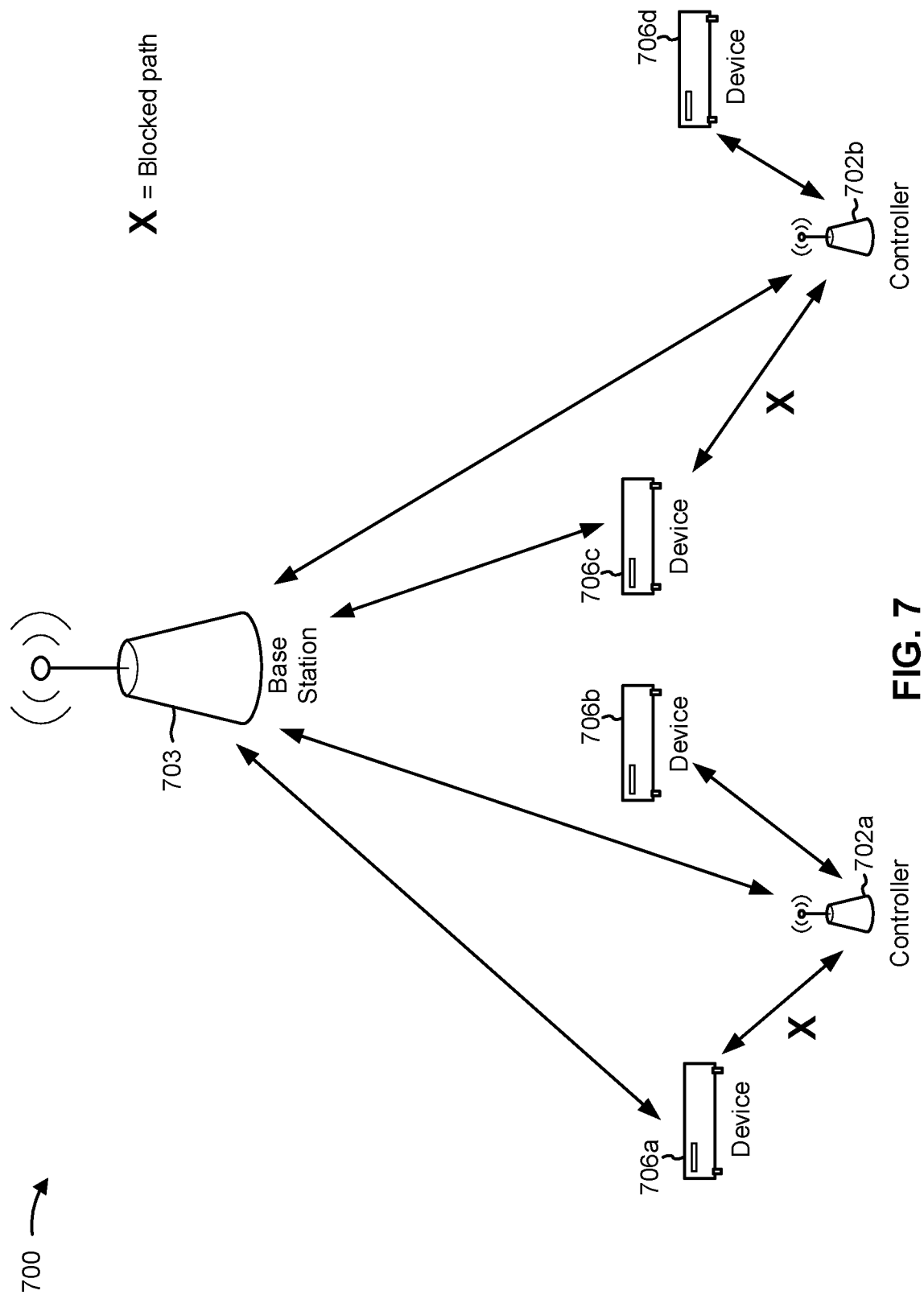
FIG. 7 is a diagram illustrating an example of aspects of a wireless communication system, in accordance with various aspects of the present disclosure.

FIG. 7 is a diagram illustrating an example 700 of aspects of a wireless communication system, in accordance with various aspects of the present disclosure. As shown, example 700 may include controller 702*a* and 702*b*, multiple devices 706*a*, 706*b*, 706*c*, 706*d*, and a base station 703. As shown in FIG. 7, the transmission path between controller 702*a* and device 706*a* is blocked, and the transmission path between controller 702*b* and device 706*c* is blocked. In FIG. 7, the controller 702*a* may transmit a first transmission (e.g., based on SPS scheduling) directly to devices 706*a* and 706*b*. The controller 702*b* may transmit a first transmission to devices 706*c* and 706*d*. The first transmission may be transmitted by the controllers directly to the devices using sidelink, as described above. If a first transmission from a controller is not accurately received by a device, the base station 703 may send a retransmission. The base station may receive the first transmission from the controller and may receive feedback or a request for retransmission from the device. In response to the feedback or request for retransmission, the base station 703 may retransmit the first transmission that was initially transmitted by the controller. For example, the base station 703 may receive the first transmission that is sent by the controller 702*a* to the devices 706*a* and device 706*b*. As the transmission path between the controller 702*a* and device 706*a* is blocked, the device 706*a* may send hybrid automatic repeat request (HARQ) feedback, such as a NACK, or may request a retransmission. The base station may receive the NACK or the retransmission request from the device 706*a*, and may retransmit the first transmission that the base station received from the controller 702*a* as a downlink transmission to the device 706*a*. Similarly, the base station 703 may provide a retransmission for device 706*c* for the first transmission from the controller 702*b*. A retransmission may be based on scheduling from the respective controller. The retransmission may be based on PDCCH scheduling from the base station.

Although aspects are described for a base station retransmission of a first transmission from a controller to the device, aspects may similarly be applied to missed transmissions from a device to a controller. Thus, if a controller does not correctly receive an uplink/sidelink transmission from a sensor actuator, the controller may send a NACK or a request for retransmission that is received by the base station. The base station may respond by sending a retransmission of the uplink/sidelink transmission from the device as a downlink transmission from the base station to the controller.

The communication system may have reduced latency because the first transmission may be provided directly from the controllers 702*a* or 702*b* to the corresponding device 706*a*-*d*, and may also be received by the base station 703 so that the base station can provide a retransmission. The communication system also provides improved reliability through the retransmission from the base station. A base station 703 may be positioned at a height or location that provides better coverage than the controller 702*a* or controller 702*b*. The base station 703 may provide an elevated transmission/reception point across controllers. Therefore, a reduced number of transmission/reception points may be deployed for each controller. The base station 703 may coordinate retransmissions to different devices or UEs across the controllers 702*a*, 702*b*.

In some examples, a blocked transmission may be identified based on a previous transmission failure between a controller and a device, or a pattern of previous failures between the controller and the device. Thus, a controller-device link may be determined to be more prone to failure or to have a lower quality for data transmission. The first transmission for the device may be transmitted using reserved resources that enable the base station 703 to also decode the first transmission. For example, the base station 703 may reserve time and/or frequency resources for data from a controller for a device such as between controller 702*a* and device 706*a*.

The base station 703 may reserve multiple resources for data transmissions from different controllers. For example, resources may be reserved for controller 702*a* and resources may be reserved for controller 702*b*. The resources may be reserved based on a likelihood of failure for first transmissions between the controller and the respective device. For example, the base station may reserve resources for transmissions between a controller and a device that are likely to fail or have a history of failure. The base station may reserve orthogonal resources. The base station may measure a channel between the base station and the controllers and may reserve orthogonal resources for controllers that may have a stronger measured interference at the base station 703. The resources used by the base station to retransmit the data from the controller for the device may also be reserved by the base station. The device may be aware of whether the retransmission is being provided by the controller and/or the base station. For example, the retransmission may be scheduled using PDCCH from the base station and/or using PDCCH/PSCCH from the controller.

As indicated above, FIG. 7 is provided as an example. Other examples may differ from what is described with respect to FIG. 7.

Figure 8:
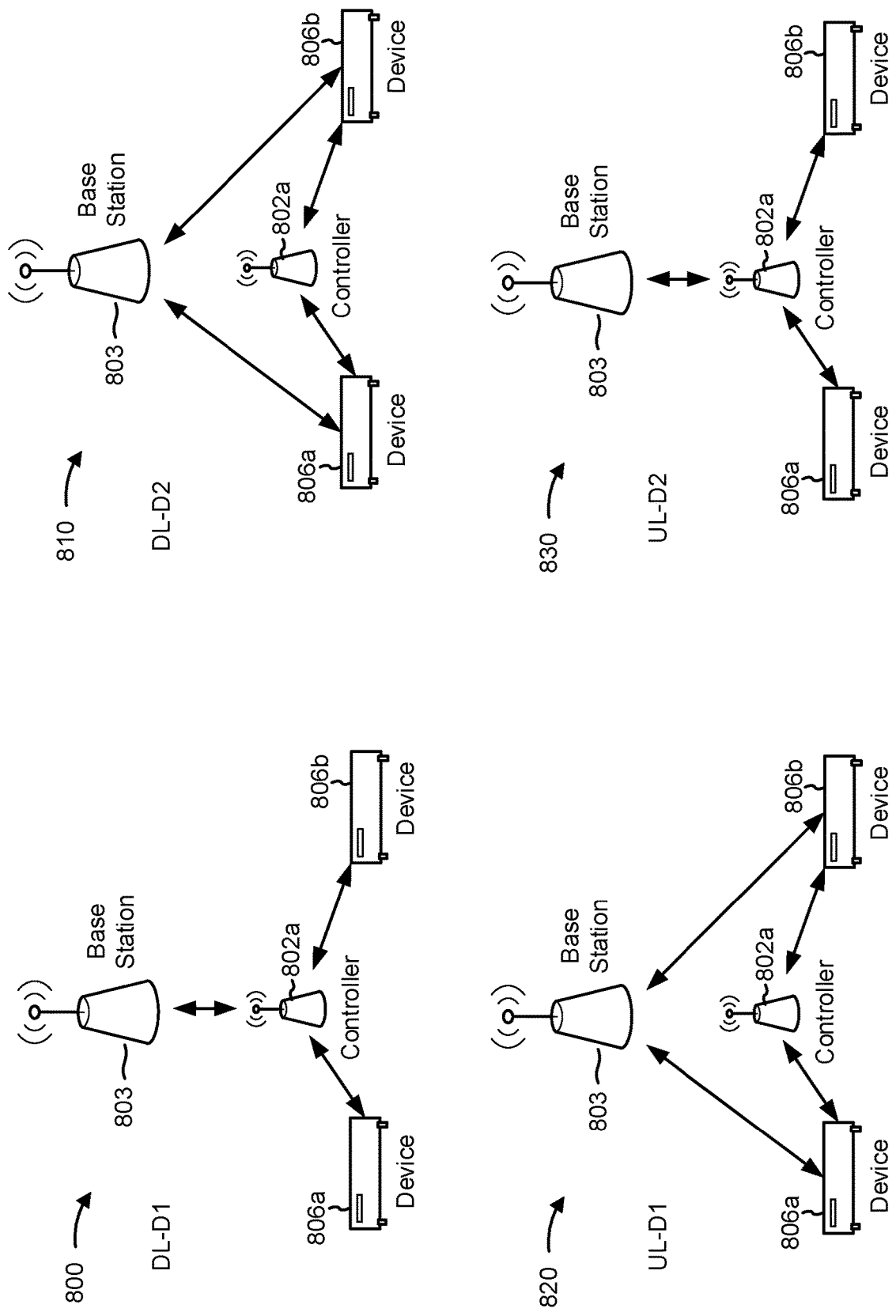
FIG. 8 is a diagram illustrating one or more examples of aspects of phases of communication in a wireless communication system, in accordance with various aspects of the present disclosure.

FIG. 8 is a diagram illustrating one or more examples 800, 810, 820, and 830 of aspects of phases of communication in a wireless communication system, in accordance with various aspects of the present disclosure. As shown, phases of traffic may be exchanged between a base station 803, a controller 802, and devices 806a and 806b. The controller 802 may correspond to the controllers 702a or 702b. The device 806a and 806b may correspond to device 706a, 706b, 706c, 706d. The communication may have a reliability on the order of $10^{-4}$. In a first example 800, the controller 802 may transmit a first transmission to the devices 806a and 806b and to the base station 803. The first example 800 may be referred to as the "DL-D1" phase. The first transmission may include a downlink transmission (e.g., a PDSCH transmission). In another example, the first transmission may be based on sidelink (e.g., a PSSCH transmission). The first transmission may be based on SPS. In the second example 810, the base station 803 may retransmit the transmission, which was initially transmitted by the controller 802, to the devices 806a and 806b. The retransmission may be sent in response to HARQ feedback or a request for retransmission from the devices 806a and 806b. In another example, the retransmission may be in response to a request from the controller 802. The second example 810 may be referred to as the "DL-D2" phase. The retransmission may be sent as PDSCH. The retransmission may be scheduled by PDCCH from the base station 803 or PDCCH/PSCCH from the controller.

In the third example 820, the devices 806a and 806b may transmit an initial uplink transmission to the controller 802, which may also be received by the base station 803. The third example 820 may be referred to as the "UL-D1" phase. The first transmission may include an uplink transmission (e.g., a PUSCH transmission). In another example, the first transmission may be based on sidelink (e.g., a physical sidelink shared channel (PSSCH) transmission). The first transmission may be based on SPS.

In the fourth example 830, the base station 803 may retransmit the transmission, which was initially transmitted by the devices 806a and 806b, to the controller 802. The fourth example 1030 may be referred to as the "UL-D2" phase. The retransmission may be sent in response to HARQ feedback or a request for retransmission from the devices from the controller 802. The retransmission may be sent as PDSCH. The retransmission may be scheduled by PDCCH from the base station 803 or PDCCH/PSCCH from the controller.

In a wireless network (e.g., an IIoT wireless network), communications among a base station, one or more controllers, and one or more devices (e.g., sensors, actuators, and/or the like) may have latency requirements, reliability requirements, and/or the like. For example, the communications may have latency requirements of about 1 to 2 milliseconds and reliability requirements of between $10^{-5}$ and $10^{-6}$ error rates (e.g., block error rate (BLER) and/or the like). To satisfy the latency requirements or the reliability requirements of the wireless network, at least one of the base station, a controller, or a device may retransmit the original transmission of a communication (e.g., if the original transmission of the communication failed, was dropped, did not satisfy a requirement (e.g., a link-quality requirement and/or the like), and/or the like). As a result, the base station may allocate resources (e.g., time resources, frequency resources, and/or the like) for the retransmissions across each link in the wireless network. To ensure that the latency requirements and the reliability requirements of the wireless network are satisfied, the base station may allocate retransmission resources across each link based on a worst-case scenario for each link (e.g., the base station may allocate sufficient retransmission resources to ensure that each link can separately satisfy the latency requirements and the reliability requirements of the wireless network).

Some techniques and apparatuses described herein provide for dynamic allocation of retransmission resources. For example, the base station may determine an estimated total amount of resources for one or more retransmissions of communications among the base station, a controller, and a device (e.g., an estimated total amount of retransmission resources for the wireless network). The communications among the base station, the controller, and the device may be associated with one or more transmissions between at least two of the base station, the controller, or the device. The base station may transmit, to at least one of the controller or the device, an indication of an allocation of resources based at least in part on the estimated total amount of resources for the one or more retransmissions. The one or more retransmissions of communications may be communicated among the base station, the controller, or the device based at least in part on the allocation of resources. This dynamic allocation of retransmission resources may conserve network resources (e.g., time resources, frequency resources, spatial resources, and/or the like) that would have otherwise been used statically allocating retransmission resources across each link based on a worst-case scenario for each link.

Figure 9A:
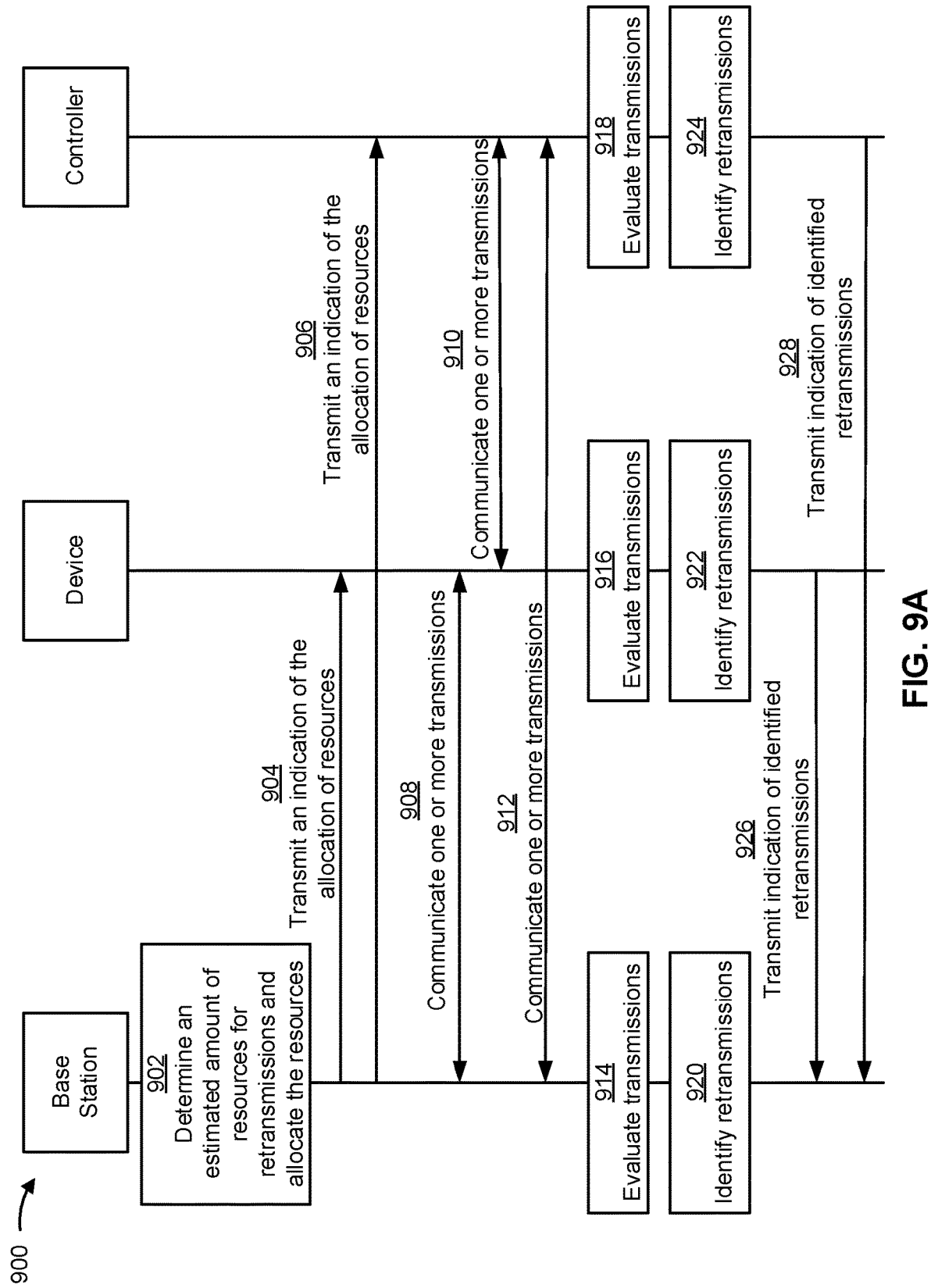
FIGS. 9A and 9B are diagrams illustrating one or more examples of dynamic allocation of retransmission resources, in accordance with various aspects of the present disclosure.
Figure 9B:
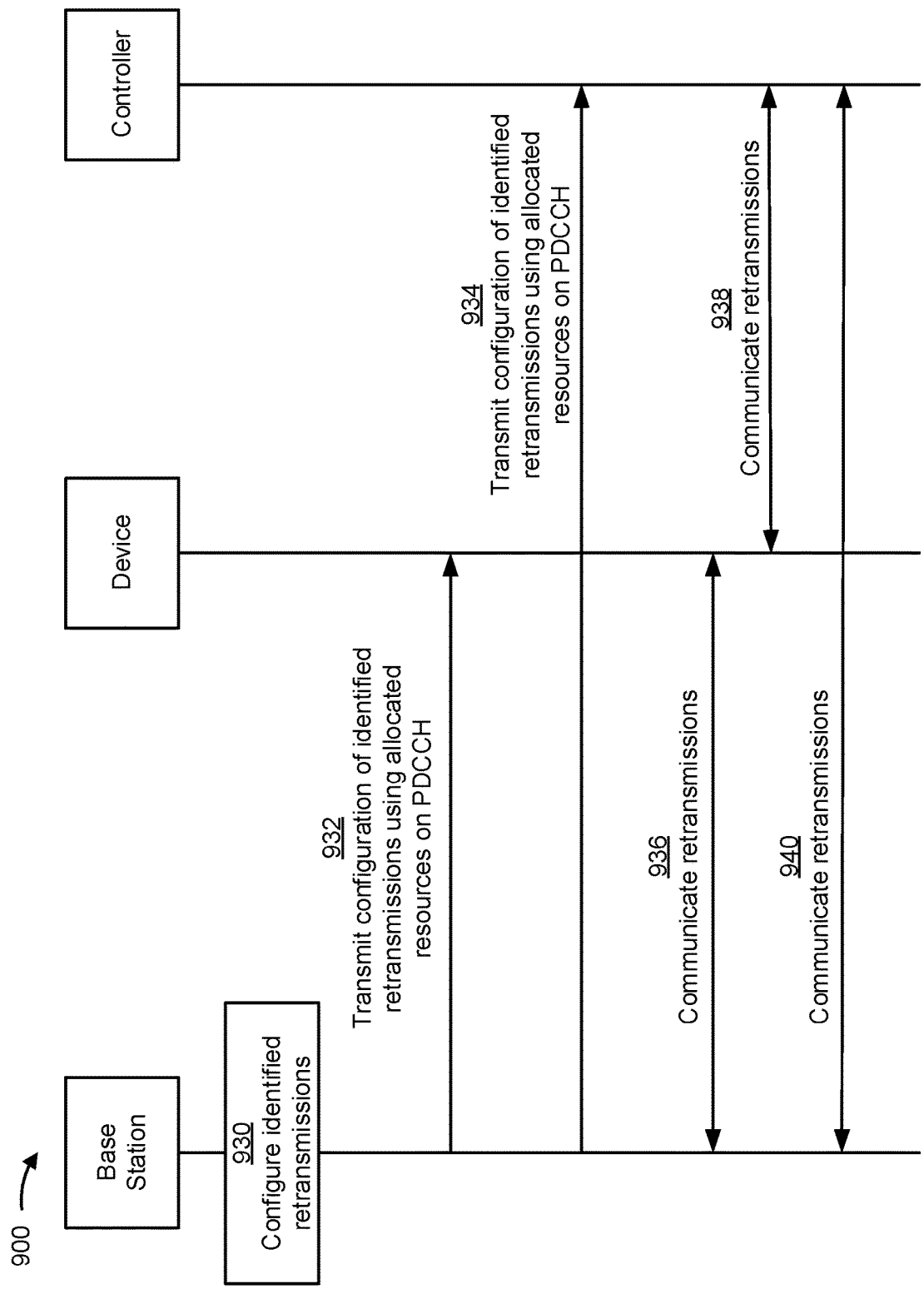

FIGS. 9A and 9B are diagrams illustrating one or more examples 900 of dynamic allocation of retransmission resources, in accordance with various aspects of the present disclosure. As shown in FIG. 9A, a base station (e.g., base station 110), a controller (e.g., base station 110 and/or user equipment (UE) 120), and one or more devices (e.g., UE 120, sensor(s), actuator(s), sensor(s)/actuator(s) (S/A), and/or the like) may communicate via a wireless network (e.g., wireless network 100). The controller may generate data to control operations of the device. In some aspects, the wireless network 100 may include an IIoT wireless network.

In some aspects, the device may be a sensor and/or an actuator (S/A). In some aspects, the controller may be a programmable logic controller (PLC). The controller may be configured to operate as a UE, a base station, a pico base station, a femto base station, and/or the like. In some aspects, the device and the controller may be associated based at least in part on an application-based association. In other words, the device and the controller may be associated based at least in part on more than a link-quality indicator (e.g., a reference signal receive power (RSRP) metric, a signal to interference plus noise ratio (SINR) metric, a number of allocated resource blocks, and/or the like). In some aspects, the device and the controller may be associated independently from a link-quality indicator.

In some aspects, the wireless network 100 may include three links for transmission of communications within the wireless network 100. For example, the wireless network 100 may include a first link between the base station and the controller, a second link between the base station and the device, and/or a third link between the controller and the device. In some aspects, the wireless network 100 may include a plurality of controllers and/or a plurality of devices. For example, there may be a plurality of first links (e.g., a link between the base station and a first controller, a link between the base station and a second controller, and/or the like). In some aspects, there may be a plurality of second links (e.g., a link between the base station and a first device, a link between the base station and a second device, and/or the like). In some aspects, there may be a plurality of third links (e.g., a link between a first controller and a first device, a link between the first controller and a second device, a link between a second controller and a third device, a link between the second controller and the first device, and/or the like).

As shown by reference number 902, the base station may determine an estimated amount of resources for retransmissions of communications among the base station, the controller, and the device (e.g., between at least two of the base station, the controller, or the device). The determination of the estimated total amount of resources for one or more retransmissions of communications is based at least in part on a total number of original transmissions (e.g., a number of packets transmitted, a number of links, and/or the like) among the base station, the controller, and the device (e.g., for the entire wireless network 100). The estimated total amount of resources for one or more retransmissions of communications may be associated with the entire wireless network 100 (e.g., rather than associated with each link in the wireless network 100). In other words, the estimated total amount of resources for one or more retransmissions of communications may not be associated with any specific link within the wireless network 100.

The base station may identify (e.g., based on a configuration and/or the like) the number of retransmission resources (e.g., a number of time resources, a number of frequency resources, and/or the like) that should be allocated to ensure that the latency requirements and the reliability requirements of the wireless network 100 are satisfied. In some aspects, the base station may identify that for 1 original transmission, 1 retransmission resource should be allocated; for 2-9 original transmissions, 2 retransmission resources should be allocated; for 10-24 original transmissions, 3 retransmission resources should be allocated; for 25-46 original transmissions, 4 retransmission resources should be allocated, and/or the like. The identified number of retransmission resources may be based at least in part on an independent error rate (e.g., $10^{-2}$ BLER and/or the like) for each original transmission. The identified number of retransmission resources may be based at least in part on a reliability requirement (e.g., $10^{-6}$ BLER and/or the like) for the entire wireless network 100.

For example, if there are 3 links within the network and there are 10 original transmissions of communications across each link, the base station may determine that there are potentially 30 total original transmissions of communication within the wireless network 100. If the base station determined the estimated amount of retransmission resources statically (e.g., allocated resources for each link based on a worst-case scenario for each link), the base station may determine that each link should have 3 retransmission resources allocated (e.g., based at least in part on the 10 original transmissions across each link) for a total of 9 retransmission resources allocated for the wireless network 100. However, the base station may determine the estimated amount of retransmission resources based on the total number of original transmissions (e.g., 30). As a result, in this case, the base station may determine that the estimated total amount of resources for one or more retransmissions of communications in the wireless network 100 is 4 retransmission resources (e.g., based at least in part on the 30 total original transmissions in the wireless network 100). Therefore, the base station may determine that the estimated total amount of resources for one or more retransmissions of communications in the wireless network (e.g., 4 retransmission resources in this case) is less than a total estimated amount of resources for retransmissions of original communications on each individual link in the wireless network (e.g., 9 retransmission resources in this case). In this way, the base station may allocate fewer resources based on a dynamic allocation of retransmission resources (e.g., 4 retransmission resources) than based on a static allocation of retransmission resources (e.g., 9 retransmission resources). This may conserve network resources that would have otherwise been used based on a static allocation of retransmission resources.

As shown by reference number 902, the base station may allocate resources based at least in part on the estimated total amount of resources for the one or more retransmissions. For example, the base station may reserve the estimated total amount of resources for the one or more retransmissions (e.g., 4 retransmission resources).

As shown by reference number 904, the base station may transmit an indication of the allocation of resources to the device. As shown by reference number 906, the base station may transmit an indication of the allocation of resources to the controller. In some aspects, the controller may receive the indication of the allocation of resources from the base station and may transmit the indication of the allocation of resources to the device. The indication of the allocation of resources may be a downlink control information (DCI) communication (e.g., a physical downlink control channel (PDCCH) communication and/or the like).

In some aspects, the controller may allocate the resources based at least in part on receiving the indication of the allocation of resources. In some aspects, the device may allocate the resources based at least in part on receiving the indication of the allocation of resources. For example, if the base station determines that the estimated total amount of resources for one or more retransmissions of communications in the wireless network is 4 retransmission resources, the controller and/or the device may allocate 4 retransmission resources.

As shown by reference numbers 908, 910, and 912, the base station, the device, and/or the controller may communicate one or more original transmissions of communications. For example, the base station may transmit one or more downlink communications to the device and/or the controller. The controller may transmit one or more downlink communications to the device. The device may transmit one or more uplink communications to the base station and/or the controller. The controller may transmit one or more uplink communications to the base station. These communications are presented as examples of original transmissions of communications. In some aspects, the original transmissions of communications may differ from what is described herein.

As shown by reference numbers 914, 916, and 918, the base station, the device, and/or the controller may evaluate the one or more original transmissions of communications. The evaluation may include evaluating (e.g., measuring) a link-quality indicator (e.g., a reference signal received power (RSRP) metric, a signal to interference plus noise ratio (SINR) metric, and/or the like) associated with each of one or more original transmissions of communications. In some aspects, the evaluation may include receiving an acknowledgement or a negative acknowledgement associated with each original transmission, receiving (or not receiving) feedback associated with the original transmission, and/or the like.

As shown by reference numbers 920, 922, and 924, the base station, the device, and/or the controller may identify one or more retransmissions of communications based at least in part on the evaluation of the one or more original transmissions of communications. For example, the base station, the device, and/or the controller may identify a retransmission of a communication based at least in part on identifying that an original transmission does not satisfy a link-quality indicator, receiving a negative acknowledgement associated with an original transmission, not receiving feedback associated with an original transmission, and/or the like.

As shown by reference numbers 926 and 928, the device and/or the controller may transmit an indication of one or more identified retransmissions of communications to the base station. For example, the device and/or the controller may transmit a communication to the base station indicating one or more identified retransmissions of communications.

In some aspects, the indication may include an indication of the quantity of retransmission resources needed for the one or more identified retransmissions. For example, the controller may identify one or more retransmissions of communications. The controller may determine an amount of retransmission resources based at least in part on the identified one or more retransmissions of communications. The controller may transmit an indication of the amount of retransmission resources associated with the controller.

The base station may identify one or more retransmissions of communications for the wireless network 100 based at least in part on the identified one or more retransmissions of communications by the base station, the one or more retransmissions indicated by the device, and/or the one or more retransmissions indicated by the controller. The base station may identify a link within the wireless network 100 associated with each identified retransmission. In some aspects, the base station may determine an amount of retransmission resources to be allocated to each link within the wireless network 100 based at least in part on the identified one or more retransmissions of communications for the wireless network 100. In some aspects, the base station may determine an amount of retransmission resources to be allocated to each link within the wireless network 100 based at least in part on the indication of one or more identified retransmissions received from the controller and/or received from the device.

As shown in FIG. 9B, and by reference number 930, the base station may determine a configuration of one or more retransmissions of communications based at least in part on the identified one or more retransmissions of communications. The base station may configure the one or more retransmissions of communications using the allocated resources.

In some aspects, the configuration of the identified retransmissions of communications may allocate resources (e.g., using the allocated resources) for retransmissions on one or more links in the wireless network 100. For example, the base station may identify an amount of retransmission resources that are to be associated with each link in the wireless network 100 based at least in part on the identified one or more retransmissions of communications. The configuration may allocate retransmission resources to one or more links in the wireless network 100 based at least in part on the identified amount of retransmission resources that are to be associated with each link. In some aspects, the configuration may allocate no retransmission resources to one or more links in the wireless network 100 (e.g., if there are no identified retransmissions of communications associated with the link).

As shown by reference numbers 932 and 934, the base station may transmit the configuration of the identified retransmissions of communications using the allocated resources. In some aspects, transmitting the configuration may include transmitting a physical downlink control channel (PDCCH) communication. The PDCCH communication may include one or more scheduling grants (e.g., one or more physical downlink shared channel (PDSCH) scheduling grants, one or more physical uplink shared channel (PUSCH) scheduling grants, and/or the like).

In some aspects, the PDCCH communication may include one or more PDSCH scheduling grants that schedule one or more downlink retransmissions of communications. In some aspects, the PDCCH communication may include one or more PUSCH scheduling grants that schedule one or more uplink retransmissions of communications.

The one or more PDSCH scheduling grants may allocate one or more sets of PDSCH resources to be used for one or more downlink retransmissions of communications. For example, the PDSCH scheduling grants may allocate at least one of a set of PDSCH resources associated with downlink retransmissions from the base station to the controller, a set of PDSCH resources associated with downlink retransmissions from the base station to the device, or a set of PDSCH resources associated with downlink retransmissions from the controller to the device.

The PDSCH scheduling grants may allocate the at least one set of PDSCH resources based at least in part on minimizing a time gap associated with PDCCH processing, minimizing a time gap associated with the controller and/or the device switching from a transmitting operating mode to a receiving operating mode, and/or the like. For example, the PDSCH scheduling grants may allocate a set of PDSCH resources associated with downlink retransmissions from the base station to the controller first, to allow time for the controller and/or the device to process the PDCCH.

The one or more PUSCH scheduling grants may allocate one or more sets of PUSCH resources to be used for one or more uplink retransmissions of communications in a similar manner as described above with respect to the one or more PDSCH scheduling grants. The configuration of the PDCCH, the one or more PDSCH scheduling grants, and the one or more PUSCH scheduling grants are discussed in more detail below with respect to FIG. 10.

As shown by reference numbers 936, 938, and 940, the base station, the device, and/or the controller may communicate the one or more retransmissions of communications based at least in part on the allocation of resources. For example, the base station, the device, and/or the controller may communicate the one or more retransmissions based at least in part on the configuration of the identified retransmissions of communications using the allocated resources. The one or more retransmissions of communications may be configured based at least in part on the PDCCH.

In some aspects, one or more of the links may not be associated with the communication of any retransmissions of communications (e.g., one or more links may have no retransmission resources allocated for the one or more links). For example, if all of the original transmissions across a link (e.g., between the base station and the device) are successful (e.g., based at least in part on the evaluation of the original transmission, as described above), then the link may have no retransmission resources allocated for the link, and no retransmissions of communications may be transmitted across the link.

In this way, some techniques and apparatuses described herein may enable a base station to dynamically allocate retransmission resources to one or more links in the wireless network 100. This dynamic allocation of retransmission resources may conserve network resources (e.g., time resources, frequency resources, spatial resources, and/or the like) that would have otherwise been used based on statically allocating retransmission resources across each link based on a worst-case scenario for each link.

As indicated above, FIGS. 9A and 9B are provided as one or more examples. Other examples may differ from what is described with respect to FIGS. 9A and 9B.

Figure 10:
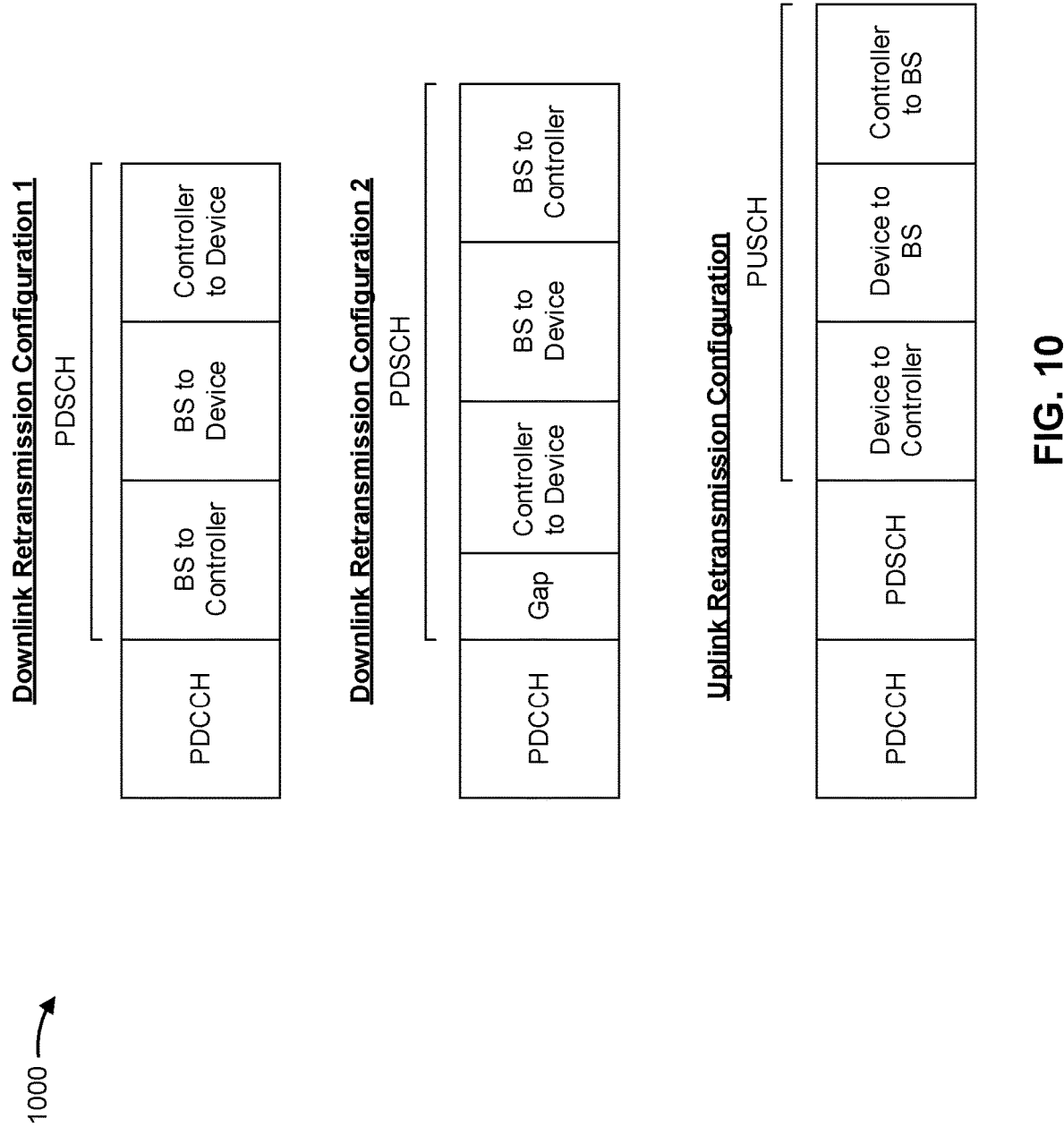
FIG. 10 is a diagram illustrating an example of one or more configurations of retransmissions of communications, in accordance with various aspects of the present disclosure.

FIG. 10 is a diagram illustrating example 1000 of one or more configurations of retransmissions of communications. The one or more configurations of retransmissions of communications may allocate resources for one or more retransmissions (e.g., downlink retransmissions, uplink retransmissions, and/or the like) among a base station (e.g., base station 110), a controller (e.g., base station 110 and/or user equipment (UE) 120), and a device (e.g., UE 120) in a wireless network (e.g., wireless network 100). As described above, the wireless network 100 may include an industrial IoT wireless network.

In some aspects, the base station may allocate retransmission resources for the wireless network 100 in a similar manner as described above with respect to FIGS. 9A and 9B. For example, the base station may allocate retransmission resources for the wireless network 100, and the base station, the controller, and/or the device may evaluate one or more original transmissions of communications and identify one or more retransmissions based at least in part on the evaluation. The base station may determine an amount of retransmission resources required for each link in the wireless network 100 based at least in part on the identified one or more retransmissions. The base station may allocate retransmission resources to each link using the allocated retransmission resources for the wireless network 100.

In some aspects, the base station may allocate retransmission resources to each link using one or more configurations of the retransmissions of communications (e.g., one or more configurations of the allocation of resources for the one or more retransmissions of communications). The one or more configurations of retransmissions of communications may include one or more downlink retransmission configurations (e.g., allocating retransmission resources for one or more downlink retransmissions) and/or one or more uplink retransmission configurations (e.g., allocating retransmission resources for one or more uplink retransmissions). The base station may transmit the one or more configurations of retransmissions of communications to the controller and/or to the device. In some aspects, the controller may receive the one or more configurations of retransmissions of communications from the base station and may transmit the one or more configurations of retransmissions of communications to the device. The transmission may include a physical downlink control channel (PDCCH) communication. The PDCCH communication may indicate the allocation of retransmission resources.

In some aspects, the one or more configurations of the retransmissions of communications may include a time gap. The time gap may be a time interval in which no retransmission resources are allocated. In some aspects, the time gap may allow for the controller and/or the device to process the PDCCH communication. In some aspects, the time gap may allow for the controller and/or the device to switch from a receiving operating mode to a transmitting operating mode and/or switch from a transmitting operating mode to a receiving operating mode. The base station may allocate the retransmission resources to each link in the wireless network 100 based at least in part on minimizing (or eliminating) a time gap included in the one or more configurations of the retransmissions of communications.

The PDCCH communication may include one or more scheduling grants for scheduling one or more retransmissions of communications. For example, the PDCCH communication may include one or more physical downlink shared channel (PDSCH) scheduling grants for scheduling one or more downlink retransmissions. The PDCCH communication may include one or more physical uplink shared channel (PUSCH) scheduling grants for scheduling one or more uplink retransmissions.

The one or more PDSCH scheduling grants may indicate an allocation of downlink retransmission resources (e.g., PDSCH resources). The PDSCH scheduling grants may indicate one or more sets of PDSCH resources. Each set may be associated with a downlink included in the wireless network 100. For example, the wireless network 100 may include a downlink from the base station to the controller, a downlink from the base station to the device, and/or a downlink from the controller to the device.

In a first downlink retransmission configuration (e.g., downlink retransmission configuration 1), the base station may allocate a first set of PDSCH resources allocated for one or more downlink retransmissions from the base station to the controller, a second set of PDSCH resources allocated for one or more downlink retransmissions from the base station to the device, and/or a third set of PDSCH resources allocated for one or more downlink retransmissions from the controller to the device. The base station may allocate the PDSCH resources in a time domain such that the first set of PDSCH resources come first, the second set of PDSCH resources come second, and the third set of PDSCH resources come third. In some aspects, the PDCCH communication may indicate to the controller that the controller is to switch from a receiving mode to a transmitting mode via the second set of PDSCH resources. In some aspects, the controller and/or the device may process the PDCCH communication via the first set of PDSCH resources. In this way, the first downlink retransmission configuration may minimize a time gap associated with the first downlink retransmission configuration.

In a second downlink retransmission configuration (e.g., downlink retransmission configuration 2), the base station may allocate the first set of PDSCH resources allocated for one or more downlink retransmissions from the base station to the controller, the second set of PDSCH resources allocated for one or more downlink retransmissions from the base station to the device, and/or the third set of PDSCH resources allocated for one or more downlink retransmissions from the controller to the device. The base station may allocate the PDSCH resources in a time domain such that after transmitting the PDCCH there is a time gap in which no PDSCH resources are allocated, followed by the third set of PDSCH resources, followed by the second set of PDSCH resources, followed by the first set of PDSCH resources. In this case, the PDCCH communication may indicate that the controller is to switch from a receiving mode to a transmitting mode during the time gap. In some aspects, the controller and/or the device may process the PDCCH communication during the time gap.

The one or more PUSCH scheduling grants may indicate an allocation of uplink retransmission resources (e.g., PUSCH resources). The PUSCH scheduling grants may indicate one or more sets of PUSCH resources. Each set may be associated with an uplink included in the wireless network 100. For example, the wireless network 100 may include an uplink from the device to the controller, an uplink from the device to the base station, and/or an uplink from the controller to the base station.

In an uplink retransmission configuration, the base station may allocate a first set of PUSCH resources allocated for one or more uplink retransmissions from the device to the controller, a second set of PUSCH resources allocated for one or more uplink retransmissions from the device to the base station, and/or a third set of PUSCH resources allocated for one or more uplink retransmissions from the controller to the base station. The base station may allocate the PUSCH resources such that the PUSCH resources are allocated after the PDCCH communication and the PDSCH resources in a time domain. The base station may allocate the PUSCH resources in the time domain such that the first set of PUSCH resources are allocated after the PDSCH resources, followed by the second set of PUSCH resources, followed by the third set of PUSCH resources. The PDCCH communication may indicate that the controller is to switch from a receiving mode to a transmitting mode via the second set of PUSCH resources. In this way, the uplink retransmission configuration may minimize (or eliminate) a time gap associated with the uplink retransmission configuration.

The first downlink retransmission configuration, the second downlink retransmission configuration, and the uplink downlink retransmission configuration are provided as examples. Other examples may differ from what is shown in FIG. 10. For example, in some aspects, a configuration may not allocate any resources for one or more of the sets of PDSCH resources and/or one or more of the sets of PUSCH resources. In some aspects, the sets of PDSCH resources and/or one or more of the sets of PUSCH resources may be allocated in a different order in the time domain than described herein.

In some aspects, a set of PDSCH resources and/or a set of PUSCH resources may be associated with one or more controllers and/or one or more devices. For example, the first set of PDSCH resources may allocate resources for downlink retransmissions from the base station to one or more controllers. The first set of PUSCH resources may allocate resources for uplink retransmissions from one or more devices to one or more controllers.

In some aspects, the one or more configurations of the retransmissions of communications may utilize time-division duplexing (TDD), frequency-division duplexing (FDD), and/or the like.

As indicated above, FIG. 10 is provided as an example. Other examples may differ from what is described with respect to FIG. 10.

Figure 11:
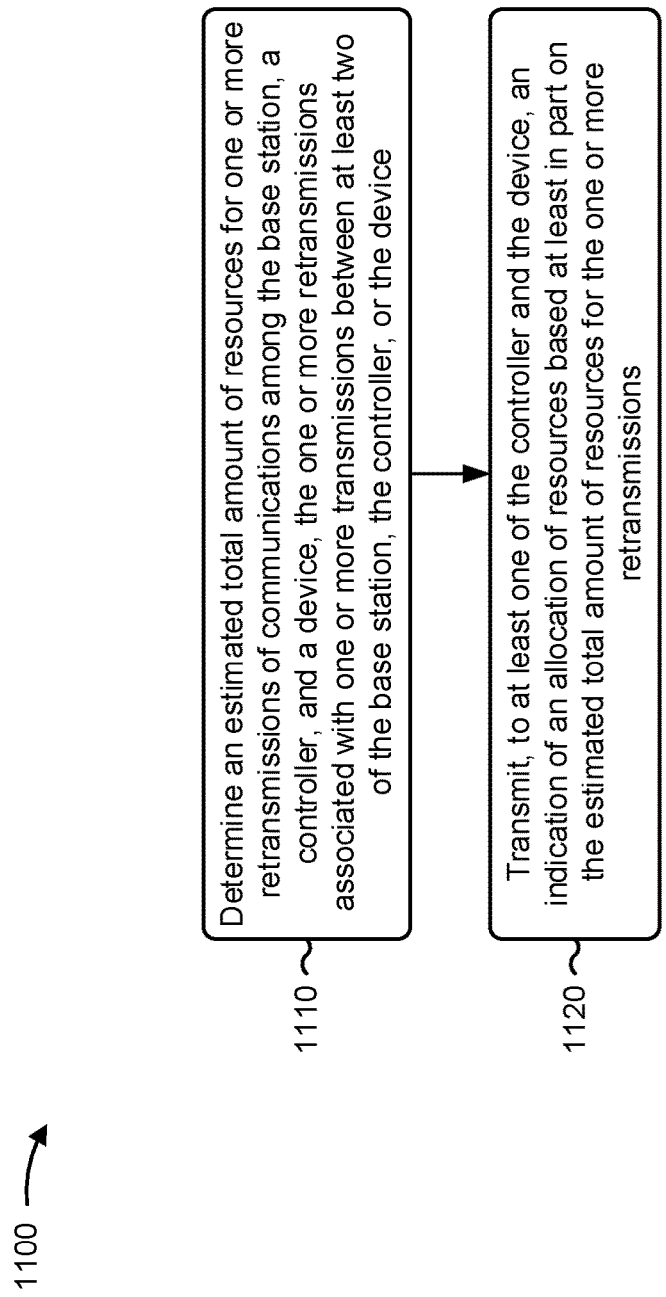
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., base station 110 and/or the like) performs operations associated with dynamic allocation of retransmission resources.

As shown in FIG. 11, in some aspects, process 1100 may include determining an estimated total amount of resources for one or more retransmissions of communications among the base station, a controller, and a device, the one or more retransmissions associated with one or more transmissions between at least two of the base station, the controller, or the device (block 1110). For example, the base station (e.g., using transmit processor 220, receive processor 238, controller/processor 240, memory 242, and/or the like) may determine an estimated total amount of resources for one or more retransmissions of communications among the base station, a controller, and a device, as described above. In some aspects, the one or more retransmissions are associated with one or more transmissions between at least two of the base station, the controller, or the device.

As further shown in FIG. 11, in some aspects, process 1100 may include transmitting, to at least one of the controller or the device, an indication of an allocation of resources based at least in part on the estimated total amount of resources for the one or more retransmissions (block 1120). For example, the base station (e.g., using transmit processor 220, receive processor 238, controller/processor 240, memory 242, and/or the like) may transmit, to at least one of the controller or the device, an indication of an allocation of resources based at least in part on the estimated total amount of resources for the one or more retransmissions, as described above.

Process 1100 may include additional aspects, such as any single aspect or any combination of aspects described below and/or in connection with one or more other processes described elsewhere herein.

In a first aspect, the allocation of resources includes a first set of resources for a first link between the base station and the controller and a second set of resources for a second link between the base station and the device, and process 1100 includes communicating, with the controller, one or more retransmissions of communications using the first set of resources for the first link; communicating, with the device, one or more retransmissions of communications using the second set of resources for the second link; or a combination thereof.

In a second aspect, alone or in combination with the first aspect, the determination of the estimated total amount of resources for one or more retransmissions of communications is based at least in part on a total number of original transmissions among the base station, the controller, and the device.

In a third aspect, alone or in combination with one or more of the first and second aspects, an amount of the allocated resources for the one or more retransmissions of communications is less than a total estimated amount of resources for retransmissions of original communications on each individual link among the base station, the controller, and the device.

In a fourth aspect, alone or in combination with one or more of the first through third aspects, process 1100 includes evaluating one or more original transmissions of communications among the base station, the controller, and the device; and identifying, based at least in part on the evaluation of the one or more original transmissions of communications, one or more retransmissions of communications, wherein a configuration of the one or more retransmissions of communications is based at least in part on the identified one or more retransmissions of communications.

In a fifth aspect, alone or in combination with one or more of the first through fourth aspects, process 1100 includes transmitting, to at least one of the controller or the device, the configuration of the one or more retransmissions of communications, wherein transmitting the configuration of the one or more retransmissions of communications includes transmitting a physical downlink control channel (PDCCH) communication.

In a sixth aspect, alone or in combination with one or more of the first through fifth aspects, the PDCCH communication includes a physical downlink shared channel (PDSCH) scheduling grant, and the PDSCH scheduling grant includes at least one of: a first set of PDSCH resources allocated for one or more downlink retransmissions from the base station to the controller; a second set of PDSCH resources allocated for one or more downlink retransmissions from the base station to the device, wherein the controller switches from a receiving mode to a transmitting mode via the second set of PDSCH resources; or a third set of PDSCH resources allocated for one or more downlink retransmissions from the controller to the device.

In a seventh aspect, alone or in combination with one or more of the first through sixth aspects, the PDCCH communication includes a PDSCH scheduling grant, and the PDSCH scheduling grant includes at least one of: a time gap for the controller to switch from a receiving mode to a transmitting mode; a first set of PDSCH resources allocated for one or more downlink retransmissions from the controller to the device; a second set of PDSCH resources allocated for one or more downlink retransmissions from the base station to the device; or a third set of PDSCH resources allocated for one or more downlink retransmissions from the base station to the controller.

In an eighth aspect, alone or in combination with one or more of the first through seventh aspects, the PDCCH communication includes a physical uplink shared channel (PUSCH) scheduling grant, and the PUSCH scheduling grant includes at least one of: a first set of PUSCH resources allocated for one or more uplink retransmissions from the device to the controller; a second set of PUSCH resources allocated for one or more uplink retransmissions from the device to the base station, the controller switches from a receiving mode to a transmitting mode via the second set of PUSCH resources; or a third set of PUSCH resources allocated for one or more uplink retransmissions from the controller to the base station.

In a ninth aspect, alone or in combination with one or more of the first through eighth aspects, the device is a sensor/actuator (S/A) and the controller is a programmable logic controller (PLC), and transmitting, to at least one of the controller or the device, the indication of an allocation of resources based at least in part on the estimated total amount of resources for the one or more retransmissions comprises: transmitting a first allocation of resources in a PDCCH communication, wherein the first allocation of resources indicates a first set of resources allocated for a first link between the base station and the PLC and a second set of resources allocated for a second link between the base station and the S/A; and subsequently retransmitting on the first link between the base station and the PLC via the first set of resources of the first allocation, retransmitting on the second link between the base station and the S/A via the second set of resources of the first allocation, or both.

In a tenth aspect, alone or in combination with one or more of the first through ninth aspects, process 1100 includes transmitting a second allocation of resources in a second PDCCH communication, wherein the second allocation of resources includes a first set of resources allocated for a first link between the base station and the PLC and a second set of resources allocated for a second link between the base station and the S/A; and subsequently retransmitting on the first link between the base station and the PLC via the first set of resources of the second allocation, retransmitting on the second link between the base station and the S/A via the second set of resources of the second allocation, or both In an eleventh aspect, alone or in combination with one or more of the first through tenth aspects, the estimated total amount of resources for retransmissions of communications is at least one of a number of resource blocks or a number of symbols, and the allocation of resources includes at least one of: a first set of resource blocks and/or symbols for a first link between the base station and the controller, a second set of resource blocks and/or symbols for a second link between the base station and the device, a third set of resource blocks and/or symbols for a third link between the controller and the device, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
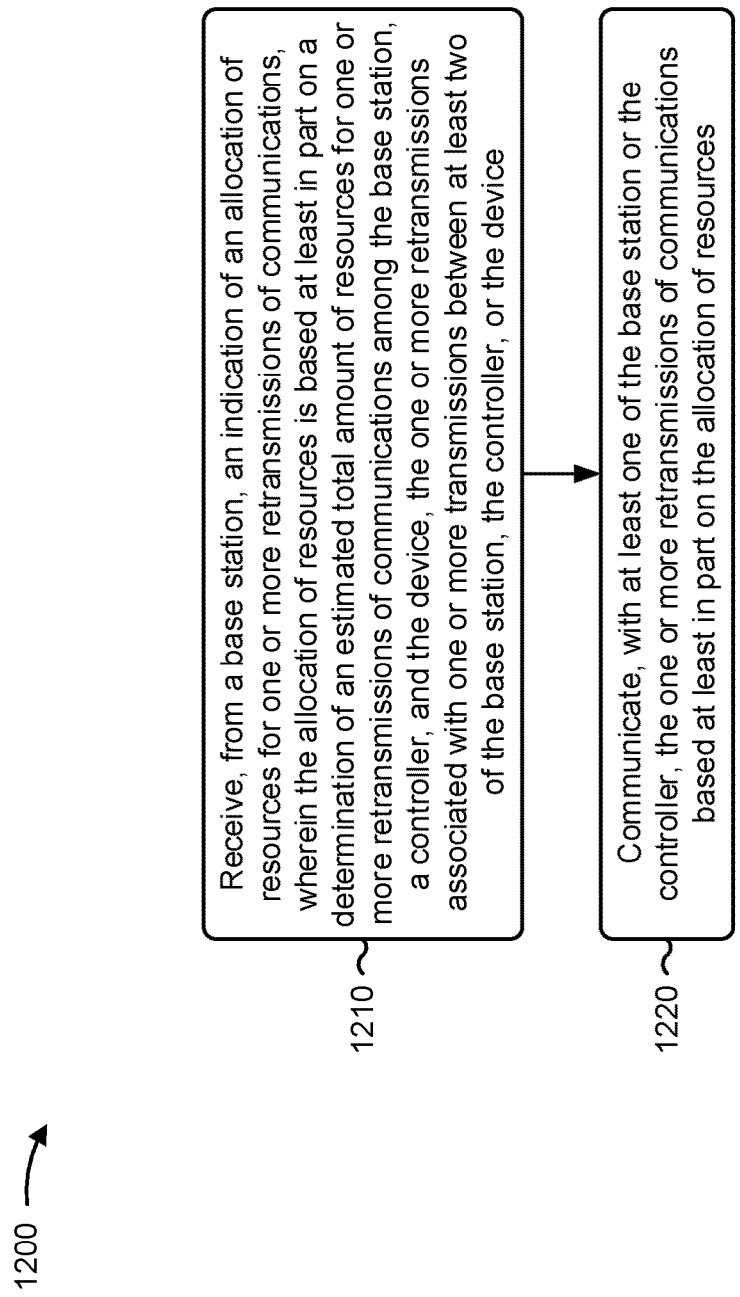
FIG. 12 is a diagram illustrating an example process performed, for example, by a device, in accordance with various aspects of the present disclosure.

FIG. 12 is a diagram illustrating an example process 1200 performed, for example, by a device, in accordance with various aspects of the present disclosure. Example process 1200 is an example where the device (e.g., UE 120 and/or the like) performs operations associated with dynamic allocation of retransmission resources.

As shown in FIG. 12, in some aspects, process 1200 may include receiving, from a base station, an indication of an allocation of resources for one or more retransmissions of communications, wherein the allocation of resources is based at least in part on a determination of an estimated total amount of resources for one or more retransmissions of communications among the base station, a controller, and the device, the one or more retransmissions associated with one or more transmissions between at least two of the base station, the controller, or the device (block 1210). For example, the device (e.g., using receive processor 258, transmit processor 264, controller/processor 280, memory 282, and/or the like) may receive, from a base station, an indication of an allocation of resources for one or more retransmissions of communications, as described above. In some aspects, the allocation of resources is based at least in part on a determination of an estimated total amount of resources for one or more retransmissions of communications among the base station, a controller, and the device. In some aspects, the one or more retransmissions are associated with one or more transmissions between at least two of the base station, the controller, or the device.

As further shown in FIG. 12, in some aspects, process 1200 may include communicating, with at least one of the base station or the controller, the one or more retransmissions of communications based at least in part on the allocation of resources (block 1220). For example, the device (e.g., using receive processor 258, transmit processor 264, controller/processor 280, memory 282, and/or the like) may communicate, with at least one of the base station or the controller, the one or more retransmissions of communications based at least in part on the allocation of resources, as described above.

Process 1200 may include additional aspects, such as any single aspect or any combination of aspects described below and/or in connection with one or more other processes described elsewhere herein.

In a first aspect, the determination of the estimated total amount of resources for one or more retransmissions of communications is based at least in part on a total number of original transmissions among the base station, the controller, and the device.

In a second aspect, alone or in combination with the first aspect, an amount of the allocated resources for the one or more retransmissions of communications is less than a total estimated amount of resources for retransmissions of original communications on each individual link among the base station, the controller, and the device.

In a third aspect, alone or in combination with one or more of the first and second aspects, process 1200 includes evaluating one or more transmissions of communications among the base station, the controller, and the device; and identifying, based at least in part on the evaluation of the one or more transmissions of communications, one or more retransmissions of communications, wherein a configuration of the one or more retransmissions of communications is based at least in part on the identified one or more retransmissions of communications.

In a fourth aspect, alone or in combination with one or more of the first through third aspects, process 1200 includes receiving, from the base station, the configuration of the one or more retransmissions of communications, wherein receiving the configuration of the one or more retransmissions of communications includes receiving a PDCCH communication.

In a fifth aspect, alone or in combination with one or more of the first through fourth aspects, the PDCCH communication includes a PDSCH scheduling grant, and the PDSCH scheduling grant includes at least one of: a first set of PDSCH resources allocated for one or more downlink retransmissions from the base station to the controller; a second set of PDSCH resources allocated for one or more downlink retransmissions from the base station to the device, wherein the controller switches from a receiving mode to a transmitting mode via the second set of PDSCH resources; or a third set of PDSCH resources allocated for one or more downlink retransmissions from the controller to the device.

In a sixth aspect, alone or in combination with one or more of the first through fifth aspects, the PDCCH communication includes a PDSCH scheduling grant, and the PDSCH scheduling grant includes at least one of: a time gap for the controller to switch from a receiving mode to a transmitting mode; a first set of PDSCH resources allocated for one or more downlink retransmissions from the controller to the device; a second set of PDSCH resources allocated for one or more downlink retransmissions from the base station to the device; or a third set of PDSCH resources allocated for one or more downlink retransmissions from the base station to the controller.

In a seventh aspect, alone or in combination with one or more of the first through sixth aspects, the PDCCH communication includes a PUSCH scheduling grant, and the PUSCH scheduling grant includes at least one of: a first set of PUSCH resources allocated for one or more uplink retransmissions from the device to the controller; a second set of PUSCH resources allocated for one or more uplink retransmissions from the device to the base station, wherein the controller switches from a receiving mode to a transmitting mode via the second set of PUSCH resources; or a third set of PUSCH resources allocated for one or more uplink retransmissions from the controller to the base station.

In an eighth aspect, alone or in combination with one or more of the first through seventh aspects, the device is a sensor/actuator (S/A) and the controller is a programmable logic controller (PLC), and receiving, from the base station, the indication of the allocation of resources for one or more retransmissions of communications comprises: receiving a first allocation of resources in a PDCCH communication, wherein the first allocation of resources indicates a first set of resources allocated for a first link between the S/A and the PLC and a second set of resources allocated for a second link between the S/A and the base station; and subsequently retransmitting on the first link between the S/A and the PLC via the first set of resources of the first allocation, retransmitting on the second link between the S/A and the base station during second set of resources of the first allocation, or both.

In a ninth aspect, alone or in combination with one or more of the first through eight aspects process 1200 includes receiving a second allocation of resources in a PDCCH communication, wherein the second allocation of resources includes a first set of resources allocated for a first link between the S/A and the PLC and a second set of resources allocated for a second link between the S/A and the base station; and subsequently retransmitting on the first link between the S/A and the PLC via the first set of resources of the second allocation, retransmitting on the second link between the S/A and the base station during second set of resources of the second allocation, or both.

In a tenth aspect, alone or in combination with one or more of the first through ninth aspects, the estimated total amount of resources for retransmissions of communications is at least one of a number of resource blocks or a number of symbols, and the allocation of resources includes at least one of: a first set of resource blocks and/or symbols for a first link between the device and the controller, a second set of resource blocks and/or symbols for a second link between the device and the base station, a third set of resource blocks and/or symbols for a third link between the controller and the base station, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
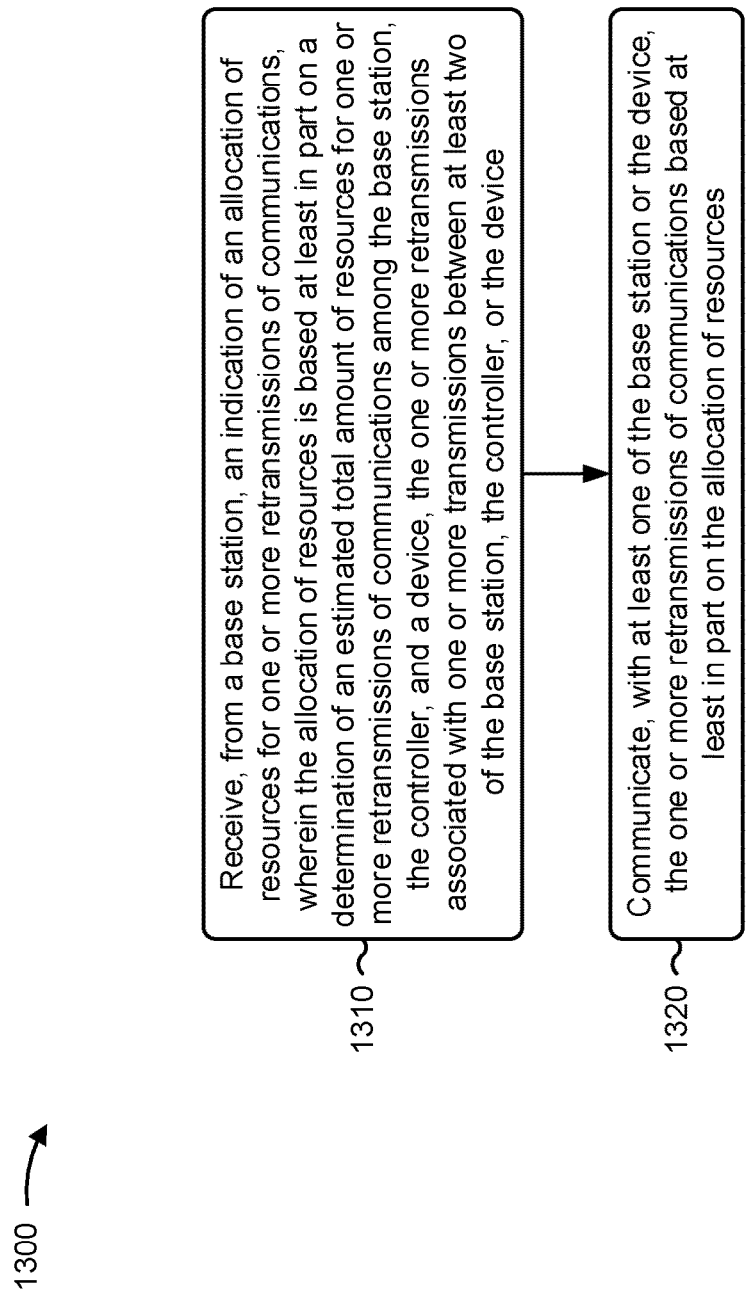
FIG. 13 is a diagram illustrating an example process performed, for example, by a controller, in accordance with various aspects of the present disclosure.

FIG. 13 is a diagram illustrating an example process 1300 performed, for example, by a controller, in accordance with various aspects of the present disclosure. Example process 1300 is an example where the controller (e.g., base station 110, UE 120, and/or the like) performs operations associated with dynamic allocation of retransmission resources.

As shown in FIG. 13, in some aspects, process 1300 may include receiving, from a base station, an indication of an allocation of resources for one or more retransmissions of communications, wherein the allocation of resources is based at least in part on a determination of an estimated total amount of resources for one or more retransmissions of communications among the base station, the controller, and a device, the one or more retransmissions associated with one or more transmissions between at least two of the base station, the controller, or the device (block 1310). For example, the controller (e.g., using transmit processor 220, receive processor 238, controller/processor 240, memory 242, receive processor 258, transmit processor 264, controller/processor 280, memory 282, and/or the like) may receive, from a base station, an indication of an allocation of resources for one or more retransmissions of communications, as described above. In some aspects, the allocation of resources is based at least in part on a determination of an estimated total amount of resources for one or more retransmissions of communications among the base station, the controller, and a device. In some aspects, the one or more retransmissions are associated with one or more transmissions between at least two of the base station, the controller, or the device.

As further shown in FIG. 13, in some aspects, process 1300 may include communicating, with at least one of the base station or the device, the one or more retransmissions of communications based at least in part on the allocation of resources (block 1320). For example, the controller (e.g., using transmit processor 220, receive processor 238, controller/processor 240, memory 242, receive processor 258, transmit processor 264, controller/processor 280, memory 282, and/or the like) may communicate, with at least one of the base station or the device, the one or more retransmissions of communications based at least in part on the allocation of resources, as described above.

Process 1300 may include additional aspects, such as any single aspect or any combination of aspects described below and/or in connection with one or more other processes described elsewhere herein.

In a first aspect, the determination of the estimated total amount of resources required for one or more retransmissions of communications is based at least in part on a total number of original transmissions among the base station, the controller, and the device.

In a second aspect, alone or in combination with the first aspect, an amount of the allocated resources for the one or more retransmissions of communications is less than a total estimated amount of resources for retransmissions of original communications on each individual link among the base station, the controller, and the device.

In a third aspect, alone or in combination with one or more of the first and second aspects, process 1300 includes evaluating one or more transmissions of communications among the base station, the controller, and the device; and identifying, based at least in part on the evaluation of the one or more transmissions of communications, one or more retransmissions of communications, wherein a configuration of the one or more retransmissions of communications is based at least in part on the identified one or more retransmissions of communications.

In a fourth aspect, alone or in combination with one or more of the first through third aspects, process 1300 includes receiving, from the base station, the configuration of the one or more retransmissions of communications, wherein receiving the configuration of the one or more retransmissions of communications includes receiving a PDCCH communication.

In a fifth aspect, alone or in combination with one or more of the first through fourth aspects, the PDCCH communication includes a PDSCH scheduling grant, and the PDSCH scheduling grant includes at least one of: a first set of PDSCH resources allocated for one or more downlink retransmissions from the base station to the controller; a second set of PDSCH resources allocated for one or more downlink retransmissions from the base station to the device; wherein the controller switches from a receiving mode to a transmitting mode via the second set of PDSCH resources; or a third set of PDSCH resources allocated for one or more downlink retransmissions from the controller to the device.

In a sixth aspect, alone or in combination with one or more of the first through fifth aspects, the PDCCH communication includes a PDSCH scheduling grant, and the PDSCH scheduling grant includes at least one of: a time gap for the controller to switch from a receiving mode to a transmitting mode; a first set of PDSCH resources allocated for one or more downlink retransmissions from the controller to the device; a second set of PDSCH resources allocated for one or more downlink retransmissions from the base station to the device; or a third set of PDSCH resources allocated for one or more downlink retransmissions from the base station to the controller.

In a seventh aspect, alone or in combination with one or more of the first through sixth aspects, the PDCCH communication includes a PUSCH scheduling grant, and the PUSCH scheduling grant includes at least one of: a first set of PUSCH resources allocated for one or more uplink retransmissions from the device to the controller; a second set of PUSCH resources allocated for one or more uplink retransmissions from the device to the base station, wherein the controller switches from a receiving mode to a transmitting mode via the second set of PUSCH resources; a third set of PUSCH resources allocated for one or more uplink retransmissions from the controller to the base station.

In an eighth aspect, alone or in combination with one or more of the first through seventh aspects, the device is a sensor/actuator (S/A) and the controller is a programmable logic controller (PLC), and receiving, from the base station, the indication of the allocation of resources for one or more retransmissions of communications comprises: receiving a first allocation of resources in a PDCCH communication, wherein the first allocation of resources indicates a first set of resources allocated for a first link between the PLC and the S/A and a second set of resources allocated for a second link between the PLC and the base station; and subsequently retransmitting on the first link between the PLC and the S/A via the first set of resources of the first allocation, retransmitting on the second link between the PLC and the base station during second set of resources of the first allocation, or both.

In a ninth aspect, alone or in combination with one or more of the first through eighth aspects, process 1300 includes receiving a second allocation of resources in a PDCCH communication, wherein the second allocation of resources includes a first set of resources allocated for the first link between the PLC and the S/A and a second set of resources allocated for the second link between the PLC and the base station; and subsequently retransmitting on the first link between the PLC and the S/A via the first set of resources of the second allocation, retransmitting on the second link between the PLC and the base station during second set of resources of the second allocation, or both.

In a tenth aspect, alone or in combination with one or more of the first through ninth aspects, the estimated total amount of resources for retransmissions of communications is at least one of a number of resource blocks or a number of symbols, and the allocation of resources includes at least one of: a first set of resource blocks and/or symbols for a first link between the controller and the device, a second set of resource blocks and/or symbols for a second link between the controller and the base station, a third set of resource blocks and/or symbols for a third link between the base station and the device, or a combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:

determining an estimated total amount of resources for one or more retransmissions of communications, the one or more retransmissions comprising:
  retransmissions between the network entity and a controller;
  retransmissions between the network entity and a device; and
  retransmissions between the controller and the device, the one or more retransmissions being associated with one or more transmissions between the network entity and the controller, the controller and the device, and the network entity and the device, wherein the estimated total amount of resources is based at least in part on a block error rate associated with each of the one or more transmissions; and
transmitting, to at least one of the controller or the device, an indication of an allocation of resources based at least in part on the estimated total amount of resources for the one or more retransmissions.

2. The method of claim 1, wherein the allocation of resources includes a first set of resources for a first link between the network entity and the controller and a second set of resources for a second link between the network entity and the device, the method further comprising at least one of:
  communicating, with the controller, one or more retransmissions of communications using the first set of resources for the first link;
  communicating, with the device, one or more retransmissions of communications using the second set of resources for the second link; or
  a combination thereof.

3. The method of claim 1, wherein an amount of the allocation of resources for the one or more retransmissions of communications is less than a total estimated amount of resources for retransmissions of original communications on each individual link among the network entity, the controller, and the device.

4. The method of claim 1, further comprising one or more of:
  evaluating one or more original transmissions of communications among the network entity, the controller, and the device;
  identifying, based at least in part on the evaluation of the one or more original transmissions of communications, one or more retransmissions of communications,
    wherein a configuration of the one or more retransmissions of communications is based at least in part on the identified one or more retransmissions of communications; or
  transmitting, to at least one of the controller or the device, the configuration of the one or more retransmissions of communications, wherein transmitting the configuration of the one or more retransmissions of communications includes transmitting a physical downlink control channel (PDCCH) communication.

5. The method of claim 4, wherein the PDCCH communication includes a physical downlink shared channel (PDSCH) scheduling grant, and
  wherein the PDSCH scheduling grant includes at least one of:
    a first set of PDSCH resources allocated for one or more downlink retransmissions from the network entity to the controller;
    a second set of PDSCH resources allocated for one or more downlink retransmissions from the network entity to the device, wherein the controller switches from a receiving mode to a transmitting mode via the second set of PDSCH resources; or a third set of PDSCH resources allocated for one or more downlink retransmissions from the controller to the device.

6. The method of claim 4, wherein the PDCCH communication includes one or more of a physical downlink shared channel (PDSCH) scheduling grant or a physical uplink shared channel (PUSCH) scheduling grant, and wherein the one or more of the PDSCH scheduling grant or the PUSCH scheduling grant includes at least one of:
a time gap for the controller to switch from a receiving mode to a transmitting mode;
a first set of PDSCH resources allocated for one or more downlink retransmissions from the controller to the device;
a second set of PDSCH resources allocated for one or more downlink retransmissions from the network entity to the device;
a third set of PDSCH resources allocated for one or more downlink retransmissions from the network entity to the controller;
a first set of PUSCH resources allocated for one or more uplink retransmissions from the device to the controller;
a second set of PUSCH resources allocated for one or more uplink retransmissions from the device to the network entity, wherein the controller switches from a receiving mode to a transmitting mode via the second set of PUSCH resources; or
a third set of PUSCH resources allocated for one or more uplink retransmissions from the controller to the network entity.

7. The method of claim 1, wherein the device is a sensor/actuator (S/A) and the controller is a programmable logic controller (PLC), and wherein transmitting, to at least one of the controller or the device, the indication of an allocation of resources based at least in part on the estimated total amount of resources for the one or more retransmissions comprises one or more of:
transmitting a first allocation of resources in a PDCCH communication, wherein the first allocation of resources indicates a first set of resources allocated for a first link between the network entity and the PLC and a second set of resources allocated for a second link between the network entity and the S/A; and
subsequently retransmitting on the first link between the network entity and the PLC via the first set of resources of the first allocation, retransmitting on the second link between the network entity and the S/A via the second set of resources of the first allocation, or both.

8. The method of claim 7, further comprising:
transmitting a second allocation of resources in a second PDCCH communication, wherein the second allocation of resources includes a first set of resources allocated for the first link between the network entity and the PLC and a second set of resources allocated for the second link between the network entity and the S/A; and
subsequently retransmitting on the first link between the network entity and the PLC via the first set of resources of the second allocation, retransmitting on the second link between the network entity and the S/A via the second set of resources of the second allocation, or both.

9. The method of claim 1, wherein the estimated total amount of resources for retransmissions of communications is at least one of a number of resource blocks or a number of symbols, and the allocation of resources includes at least one of:
a first set of resource blocks and/or symbols for a first link between the network entity and the controller,
a second set of resource blocks and/or symbols for a second link between the network entity and the device,
a third set of resource blocks and/or symbols for a third link between the controller and the device, or
a combination thereof.

10. A method of wireless communication performed by a device, comprising:
receiving, from a network entity, an indication of an allocation of resources for one or more retransmissions of communications, wherein the allocation of resources is based at least in part on a determination of an estimated total amount of resources for one or more retransmissions of communications, the one or more retransmissions comprising:
retransmissions between the network entity and a controller;
retransmissions between the network entity and a device; and
retransmissions between the controller and the device, the one or more retransmissions associated with one or more transmissions between the network entity and the controller, the controller and the device, and the network entity and the device, wherein the estimated total amount of resources is based at least in part on a block error rate associated with each of the one or more transmissions; and
communicating, with at least one of the network entity or the controller, the one or more retransmissions of communications based at least in part on the allocation of resources.

11. The method of claim 10, wherein an amount of the allocation of resources for the one or more retransmissions of communications is less than a total estimated amount of resources for retransmissions of original communications on each individual link among the network entity, the controller, and the device.

12. The method of claim 10, further comprising one or more of:
evaluating one or more transmissions of communications among the network entity, the controller, and the device; and
identifying, based at least in part on the evaluation of the one or more transmissions of communications, one or more retransmissions of communications, and
wherein a configuration of the one or more retransmissions of communications is based at least in part on the identified one or more retransmissions of communications; or
receiving, from the network entity, the configuration of the one or more retransmissions of communications, wherein receiving the configuration of the one or more retransmissions of communications includes receiving a physical downlink control channel (PDCCH) communication.

13. The method of claim 12, wherein the PDCCH communication includes a physical downlink shared channel (PDSCH) scheduling grant, and
wherein the PDSCH scheduling grant includes at least one of:
a first set of PDSCH resources allocated for one or more downlink retransmissions from the network entity to the controller;

a second set of PDSCH resources allocated for one or more downlink retransmissions from the network entity to the device, wherein the controller switches from a receiving mode to a transmitting mode via the second set of PDSCH resources; or a third set of PDSCH resources allocated for one or more downlink retransmissions from the controller to the device.

14. The method of claim 12, wherein the PDCCH communication includes a physical downlink shared channel (PDSCH) scheduling grant, and wherein the PDSCH scheduling grant includes at least one of:
a time gap for the controller to switch from a receiving mode to a transmitting mode;
a first set of PDSCH resources allocated for one or more downlink retransmissions from the controller to the device;
a second set of PDSCH resources allocated for one or more downlink retransmissions from the network entity to the device; or
a third set of PDSCH resources allocated for one or more downlink retransmissions from the network entity to the controller.

15. The method of claim 12, wherein the PDCCH communication includes a physical uplink shared channel (PUSCH) scheduling grant, and wherein the PUSCH scheduling grant includes at least one of:
a first set of PUSCH resources allocated for one or more uplink retransmissions from the device to the controller;
a second set of PUSCH resources allocated for one or more uplink retransmissions from the device to the network entity, wherein the controller switches from a receiving mode to a transmitting mode via the second set of PUSCH resources; or
a third set of PUSCH resources allocated for one or more uplink retransmissions from the controller to the network entity.

16. The method of claim 10, wherein the device is a sensor/actuator (S/A) and the controller is a programmable logic controller (PLC), and wherein receiving, from the network entity, the indication of the allocation of resources for one or more retransmissions of communications comprises:

receiving a first allocation of resources in a PDCCH communication, wherein the first allocation of resources indicates a first set of resources allocated for a first link between the S/A and the PLC and a second set of resources allocated for a second link between the S/A and the network entity; and
subsequently retransmitting on the first link between the S/A and the PLC via the first set of resources of the first allocation, retransmitting on the second link between the S/A and the network entity during second set of resources of the first allocation, or both.

17. The method of claim 16, further comprising:
receiving a second allocation of resources in a PDCCH communication, wherein the second allocation of resources includes a first set of resources allocated for the first link between the S/A and the PLC and a second set of resources allocated for the second link between the S/A and the network entity; and
subsequently retransmitting on the first link between the S/A and the PLC via the first set of resources of the second allocation, retransmitting on the second link between the S/A and the network entity during second set of resources of the second allocation, or both.

18. The method of claim 10, wherein the estimated total amount of resources for retransmissions of communications is at least one of a number of resource blocks or a number of symbols, and the allocation of resources includes at least one of:
a first set of resource blocks and/or symbols for a first link between the device and the controller,
a second set of resource blocks and/or symbols for a second link between the device and the network entity,
a third set of resource blocks and/or symbols for a third link between the controller and the network entity, or
a combination thereof.

19. A method of wireless communication performed by a controller, comprising:
receiving, from a network entity, an indication of an allocation of resources for one or more retransmissions of communications, wherein the allocation of resources is based at least in part on a determination of an estimated total amount of resources for one or more retransmissions of communications, the one or more retransmissions comprising:
retransmissions between the network entity and a controller;
retransmission between the network entity and a device; and
retransmissions between the controller and the device, the one or more retransmissions associated with one or more transmissions between the network entity and the controller, the controller and the device, and the network entity and the device, wherein the estimated total amount of resources is based at least in part on a block error rate associated with each of the one or more transmissions; and
communicating, with at least one of the network entity or the device, the one or more retransmissions of communications based at least in part on the allocation of resources.

20. The method of claim 19, wherein an amount of the allocation of resources for the one or more retransmissions of communications is less than a total estimated amount of resources for retransmissions of original communications on each individual link among the network entity, the controller, and the device.

21. The method of claim 19, further comprising one or more of:
evaluating one or more transmissions of communications among the network entity, the controller, and the device; and
identifying, based at least in part on the evaluation of the one or more transmissions of communications, one or more retransmissions of communications, and
wherein a configuration of the one or more retransmissions of communications is based at least in part on the identified one or more retransmissions of communications; or
receiving, from the network entity, the configuration of the one or more retransmissions of communications, wherein receiving the configuration of the one or more retransmissions of communications includes receiving a physical downlink control channel (PDCCH) communication.

22. The method of claim 21, wherein the PDCCH communication includes a physical downlink shared channel (PDSCH) scheduling grant, and wherein the PDSCH scheduling grant includes at least one of:
- a first set of PDSCH resources allocated for one or more downlink retransmissions from the network entity to the controller;
- a second set of PDSCH resources allocated for one or more downlink retransmissions from the network entity to the device, wherein the controller switches from a receiving mode to a transmitting mode via the second set of PDSCH resources; or
- a third set of PDSCH resources allocated for one or more downlink retransmissions from the controller to the device.

23. The method of claim 21, wherein the PDCCH communication includes a physical downlink shared channel (PDSCH) scheduling grant, and
wherein the PDSCH scheduling grant includes at least one of:
- a time gap for the controller to switch from a receiving mode to a transmitting mode;
- a first set of PDSCH resources allocated for one or more downlink retransmissions from the controller to the device;
- a second set of PDSCH resources allocated for one or more downlink retransmissions from the network entity to the device; or
- a third set of PDSCH resources allocated for one or more downlink retransmissions from the network entity to the controller.

24. The method of claim 21, wherein the PDCCH communication includes a physical uplink shared channel (PUSCH) scheduling grant, and
wherein the PUSCH scheduling grant includes at least one of:
- a first set of PUSCH resources allocated for one or more uplink retransmissions from the device to the controller;
- a second set of PUSCH resources allocated for one or more uplink retransmissions from the device to the network entity, wherein the controller switches from a receiving mode to a transmitting mode via the second set of PUSCH resources; or
- a third set of PUSCH resources allocated for one or more uplink retransmissions from the controller to the network entity.

25. The method of claim 19, wherein the device is a sensor/actuator (S/A) and the controller is a programmable logic controller (PLC), and wherein receiving, from the network entity, the indication of the allocation of resources for one or more retransmissions of communications comprises:
receiving a first allocation of resources in a PDCCH communication, wherein the first allocation of resources indicates a first set of resources allocated for a first link between the PLC and the S/A and a second set of resources allocated for a second link between the PLC and the network entity; and
subsequently retransmitting on the first link between the PLC and the S/A via the first set of resources of the first allocation, retransmitting on the second link between the PLC and the network entity during second set of resources of the first allocation, or both.

26. The method of claim 25, further comprising:
receiving a second allocation of resources in a PDCCH communication, wherein the second allocation of resources includes a first set of resources allocated for the first link between the PLC and the S/A and a second set of resources allocated for the second link between the PLC and the network entity; and
subsequently retransmitting on the first link between the PLC and the S/A via the first set of resources of the second allocation, retransmitting on the second link between the PLC and the network entity during second set of resources of the second allocation, or both.

27. The method of claim 19, wherein the estimated total amount of resources for retransmissions of communications is at least one of a number of resource blocks or a number of symbols, and the allocation of resources includes at least one of:
- a first set of resource blocks and/or symbols for a first link between the controller and the device,
- a second set of resource blocks and/or symbols for a second link between the controller and the network entity,
- a third set of resource blocks and/or symbols for a third link between the network entity and the device, or
- a combination thereof.

28. A network entity for wireless communication, comprising:
a memory; and
one or more processors coupled to the memory, the one or more processors individually or collectively configured to cause the network entity to:
determine an estimated total amount of resources for one or more retransmissions of communications, the one or more retransmissions comprising:
retransmissions between the network entity and a controller;
retransmissions between the network entity and a device; and
retransmissions between the controller and the device,
the one or more retransmissions being associated with one or more transmissions between the network entity and the controller, the controller and the device, and the network entity and the device, wherein the estimated total amount of resources is based at least in part on a block error rate associated with each of the one or more transmissions; and
transmit, to at least one of the controller or the device, an indication of an allocation of resources based at least in part on the estimated total amount of resources for the one or more retransmissions.

29. The network entity of claim 28, wherein the allocation of resources includes a first set of resources for a first link between the network entity and the controller and a second set of resources for a second link between the network entity and the device, and
wherein the memory and the one or more processors are further configured to:
communicate, with the controller, one or more retransmissions of communications using the first set of resources for the first link;
communicate, with the device, one or more retransmissions of communications using the second set of resources for the second link; or
a combination thereof.

30. The network entity of claim 28, wherein the memory and the one or more processors are further configured to:
evaluate one or more original transmissions of communications among the network entity, the controller, and the device;
identify, based at least in part on the evaluation of the one or more original transmissions of communications, one or more retransmissions of communications, wherein a configuration of the one or more retransmissions of communications is based at least in part on the identified one or more retransmissions of communications; or transmit, to at least one of the controller or the device, the configuration of the one or more retransmissions of communications, wherein transmitting the configuration of the one or more retransmissions of communications includes transmitting a physical downlink control channel (PDCCH) communication.

* * * * *